(12) United States Patent
Goja et al.

(10) Patent No.: US 10,885,653 B2
(45) Date of Patent: Jan. 5, 2021

(54) SYSTEMS AND METHODS FOR MOBILE PARCEL DIMENSION CALCULATION AND PREDICTIVE CONDITION ANALYSIS

(71) Applicant: United Parcel Service of America, Inc., Atlanta, GA (US)

(72) Inventors: Asheesh Goja, Upper Saddle River, NJ (US); Eric Almberg, Atlanta, GA (US)

(73) Assignee: United Parcel Service of America, Inc., Atlanta, GA (US)

(*) Notice: Subject to any disclaimer, the term of this patent is extended or adjusted under 35 U.S.C. 154(b) by 78 days.

(21) Appl. No.: 16/245,916

(22) Filed: Jan. 11, 2019

(65) Prior Publication Data

US 2019/0220990 A1 Jul. 18, 2019

Related U.S. Application Data

(60) Provisional application No. 62/616,855, filed on Jan. 12, 2018.

(51) Int. Cl.
| | | |
|---|---|---|
| *G06T 7/60* | (2017.01) | |
| *G06T 7/00* | (2017.01) | |
| *G06Q 10/08* | (2012.01) | |
| *G06T 7/62* | (2017.01) | |
| *G06T 7/13* | (2017.01) | |

(Continued)

(52) U.S. Cl.
CPC .............. *G06T 7/60* (2013.01); *G06Q 10/083* (2013.01); *G06Q 50/28* (2013.01); *G06T 7/001* (2013.01); *G06T 7/0006* (2013.01); *G06T 7/13* (2017.01); *G06T 7/62* (2017.01); *B64C 39/024* (2013.01); *G06N 20/00* (2019.01);

(Continued)

(58) Field of Classification Search
CPC .. G06T 7/60; G06T 7/001; G06T 7/62; G06T 7/13; G06T 7/0006; G06T 2207/30112; G06T 2207/20081; G06T 2207/20164; G06Q 10/083; G06Q 50/28; B64C 39/024; G06N 20/00
See application file for complete search history.

(56) References Cited

U.S. PATENT DOCUMENTS

| | | | |
|---|---|---|---|
| 9,478,030 B1 | 10/2016 | Lecky | |
| 2015/0170378 A1* | 6/2015 | Moran | ................ G06K 9/4604 348/135 |

(Continued)

OTHER PUBLICATIONS

International Search Report and Written Opinion received for PCT Patent Application No. PCT/US2019/013508, dated Mar. 21, 2019, 10 pages.

*Primary Examiner* — Menatoallah Youssef
(74) *Attorney, Agent, or Firm* — Shook, Hardy & Bacon L.L.P.

(57) ABSTRACT

Present aspects are directed to a system that receives digital images of parcels at various points throughout a transportation and logistics network. Based on analysis of a single digital image of a parcel, the dimensions of the parcel are detected and calculated. A single digital image of a parcel is captured at various points throughout a transit or shipping network. The single digital image is processed using computer vision for image manipulation. Key identifying points of the parcel (e.g., a label or bar code) can be detected through the processing. The processed digital image is input into a mathematical model that generates an estimate for all dimensions of the parcel.

18 Claims, 12 Drawing Sheets

(51) Int. Cl.
*G06Q 50/28* (2012.01)
*B64C 39/02* (2006.01)
*G06N 20/00* (2019.01)

(52) U.S. Cl.
CPC ............... *G06T 2207/20081* (2013.01); *G06T 2207/20164* (2013.01); *G06T 2207/30112* (2013.01)

(56) References Cited

U.S. PATENT DOCUMENTS

| | | |
|---|---|---|
| 2017/0154302 A1 | 6/2017 | Streebin et al. |
| 2017/0313421 A1 | 11/2017 | Gil |
| 2019/0102874 A1 | 4/2019 | Goja |
| 2019/0139250 A1* | 5/2019 | Tricoukes ................. G06T 7/13 |

* cited by examiner

SYSTEMS AND METHODS FOR MOBILE PARCEL DIMENSION CALCULATION AND PREDICTIVE CONDITION ANALYSIS

CROSS REFERENCE TO RELATED APPLICATIONS

This application, having application No. 16/245,916 and entitled "Systems and Methods for Mobile Parcel Dimension Calculation and Predictive Condition Analysis," claims priority to U.S. Provisional Patent Application No. 62/616,855, filed Jan. 12, 2018, and entitled "Systems and Methods for Mobile Parcel Dimension Calculation and Predictive Condition Analysis," the entirety of which is incorporated herein by reference.

FIELD

The present disclosure relates to parcel transportation and logistics networks and, more particularly, to the capture of digital images of parcels; the detection and confirmation of parcel dimensions and conditions; and the provision of information about the parcel dimensions as an impetus for the use of machine learning for detection, characterization, diagnosis, cost analysis, root cause analysis, and automatic mitigation of the root cause of any damage.

BACKGROUND

A parcel is transported from an origin to a destination and may have various intermediate locations and interactions during such transport, including with a sender at the time of shipping. At the time of shipping, a sender must enter parcel dimensions, and throughout the transport of the parcel, parcel dimensions must be obtained and confirmed. Naturally, an increase in the number of locations and interactions during transport increases the number of possible points at which the parcel can be damaged, which in turn may cause a change in package dimensions in some cases. Obtaining and confirming parcel dimensions can be a tedious process, and one fraught with errors and miscalculations.

If a package is damaged during the transport process, a shipping and logistics provider may be responsible for the damages. However, it may be difficult to determine if the parcel was damaged at the time it was picked up or during transport. Further, if a particular point of damage is located, it may be difficult to mitigate such damaging conditions in an efficient manner. Through applied effort, ingenuity, and innovation, many of these identified problems have been solved by developing solutions that are included in embodiments of the present disclosure, many examples of which are described in detail herein.

SUMMARY

According to embodiments, the present system receives digital images of parcels at various points throughout a transportation and logistics network. Through the analysis of a single digital image of a parcel, embodiments of the present disclosure detect and calculate dimensions of the parcel.

For example, a single digital image of a parcel is captured at various points throughout a transit or shipping network. The single digital image is processed using computer vision for image manipulation. Key identifying points of the parcel (e.g., a label or bar code) can be detected through the processing. The processed digital image is input into a mathematical model that generates an estimate for all dimensions of the parcel. According to embodiments, events can be driven based upon detected differences between calculated dimensions and expected dimensions of the parcel, because a divergence between the two will often signal the occurrence of damage to the parcel.

Generally, the methods, apparatus, and computer program products described herein are operable to receive a first parcel digital image from a mobile computing device at the origin interaction point. In embodiments, the first parcel digital image is associated with and representative of a parcel being transported from the origin interaction point to the destination interaction point via the plurality of parcel interaction points.

The methods, apparatus, and computer program products described herein are operable to identify, using digital detection, a first group of pixels in the first parcel digital image corresponding to a first upper rear corner of the parcel and a second group of pixels in the first parcel digital image corresponding to a second upper rear corner of the parcel. In embodiments, the first upper rear corner and the second upper rear corner are separated by an upper rear edge of the parcel. In embodiments, the upper rear edge of the parcel has a length H1.

Additionally, the methods, apparatus, and computer program products described herein are operable to identify, using digital detection, a third group of pixels in the first parcel digital image corresponding to a first upper front corner and a fourth group of pixels in the first parcel digital image corresponding to a first lower front corner of the parcel in the first parcel digital image. In embodiments, the first upper front corner and the first lower front corner are separated by a first front side edge of the parcel. In embodiments, the first front side edge of the parcel has a length DL. In embodiments, the first upper front corner and the first upper rear corner are separated by a first upper side edge of the parcel, and the first upper side edge of the parcel has a length UL.

Further, the methods, apparatus, and computer program products described herein are operable to identify, using digital detection, a fifth group of pixels in the first parcel digital image corresponding to a second lower front corner and a sixth group of pixels in the first parcel digital image corresponding to a second lower rear corner of the parcel in the first parcel digital image. In embodiments, the second lower front corner and the second lower rear corner are separated by a second lower side edge of the parcel and the second lower side edge of the parcel has a length DR. In embodiments, the second lower front corner and the first lower front corner are separated by a lower front edge of the parcel, and the lower front edge of the parcel has a length H2. In embodiments, the second upper rear corner and the second lower rear corner are separated by a second rear side edge of the parcel, and the second rear side edge of the parcel has a length UR.

In further aspects, the methods, apparatus, and computer program products described herein are operable to identify, using digital detection, a seventh group of pixels in the first parcel digital image corresponding to a reference label affixed to the parcel, and the reference label has a known first edge length R1 and a known second edge length R2.

Additionally, the methods, apparatus, and computer program products described herein are operable to programmatically calculate, using the identified groups of pixels, each of lengths H1, UL, DL, DR, H2, and U2, as well as an associated angle for each length relative the horizontal axis of the first parcel digital image.

The methods, apparatus, and computer program products described herein are operable to programmatically determine correction factors to apply to each of lengths H1, UL, DL, DR, H2, and U2 based upon a scale programmatically calculated based upon R1 and R2.

In additional aspects, the methods, apparatus, and computer program products described herein are operable to apply the correction factors to each of lengths H1, UL, DL, DR, H2, and U2 and confirm that length H1≈length H2, length DR≈length UL, and length UR≈length DL. It will be appreciated that "≈" used herein refers to a confidence threshold that is adjustable based upon a quality of the image. For example, a busy background will require more tolerance than a nice, clean, single color background. In some embodiments, "≈" represents an 80%-90% match.

In yet other aspects, the methods, apparatus, and computer program products described herein are operable to, upon confirming that length H1≈length H2, length DR≈length UL, and length UR≈length DL, scale the corrected lengths to inches and output the scaled corrected lengths as calculated dimensions of the parcel.

In further aspects, the methods, apparatus, and computer program products described herein are operable to programmatically determine the correction factors and the scale by programmatically determining an angular skew between a first relative angle between lengths R1 and H1 and a second relative angle between lengths R1 and H2, upon determining that the angular skew is below an angular skew threshold, programmatically calculating a vertical angle of the parcel in the first parcel digital image according to the equation $$\sin^{-1}\left(\frac{R1}{R2}\right),$$

programmatically calculating a front side angle of the parcel in the first parcel digital image according to the equation $$90° - \sin^{-1}\left(\frac{R1}{R2}\right),$$

and, using the vertical angle of the parcel and the front side angle of the parcel, calculating correction factors facilitating generation, from lengths R1 and R2, of scales for each of the upper rear edge, first upper side edge, first front side edge, lower front edge, second lower side edge, and second rear side edge of the parcel. In some embodiments, lengths R1 and R2 are determined using machine learning.

The methods, apparatus, and computer program products described herein are operable to compare the calculated dimensions of the parcel to known dimension information about the parcel retrieved based upon parcel information obtained from the reference label. Upon determining that a difference between the calculated dimensions and the known dimension information exceeds a threshold, the methods, apparatus, and computer program products transmit a dimension anomaly signal to a predictive parcel damage mitigation system. The methods, apparatus, and computer program products described herein are operable to compare the calculated dimensions of the parcel to known dimension information about the parcel retrieved based upon parcel information obtained from the reference label. Additionally, the methods, apparatus, and computer program products described herein are operable to, upon determining that a difference between the calculated dimensions and the known dimension information does not exceed a threshold, transmit a dimension acceptance signal to the mobile computing device.

The methods, apparatus, and computer program products described herein are operable to, upon determining that the angular skew exceeds the angular skew threshold, apply corrective trigonometric calculations before calculating the vertical angle of the parcel.

In embodiments, applying the corrective trigonometric calculations comprises calculating an orientation of the parcel relative to the observer (camera) using the reference object. From there, trigonometric projections are applied based on the calculated angles of rotation and tilt to calculate how much "compression" should be expected for a side of a parcel. For example, if the parcel is only rotated 10 degrees, the side that is mostly facing the observer (camera) will require very little correction. However the side that is barely observable is referred to as compressed in the image because if its length were to be calculated by counting pixels without first trying to correct for skew, a much smaller side length than actual would result. Correction factors represent the amount of compression in that axis is expected based on the angles the parcel is presenting to the observer (camera).

In embodiments, the correction factors comprise three separate scaling factors between 0 and 1 which denote how much a specific axis is compressed in computer vision. Dividing the observed length directly from the digital image by the correction factor yields the actual length of the specific axis.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION

Having thus described the disclosure in general terms, reference will now be made to the accompanying drawings, which are not necessarily drawn to scale, and wherein:

FIG. 1 provides an illustration of an exemplary embodiment of the present disclosure;

FIG. 2 provides a schematic of an analysis computing entity according to one embodiment of the present disclosure;

FIG. 3 provides an illustrative schematic representative of a mobile computing entity 110 that can be used in conjunction with embodiments of the present disclosure;

Figure 6A:
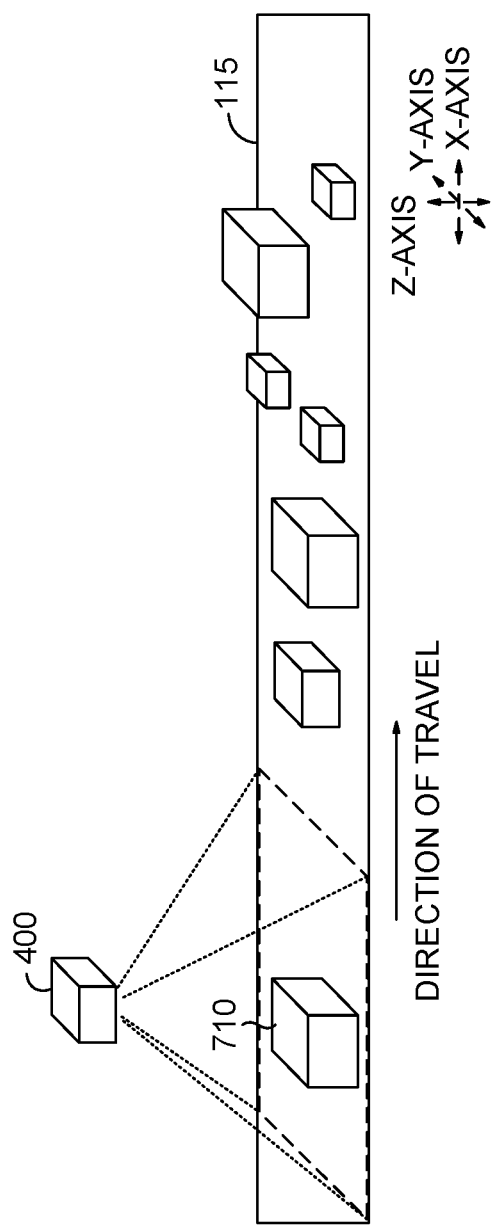
Figure 6B:
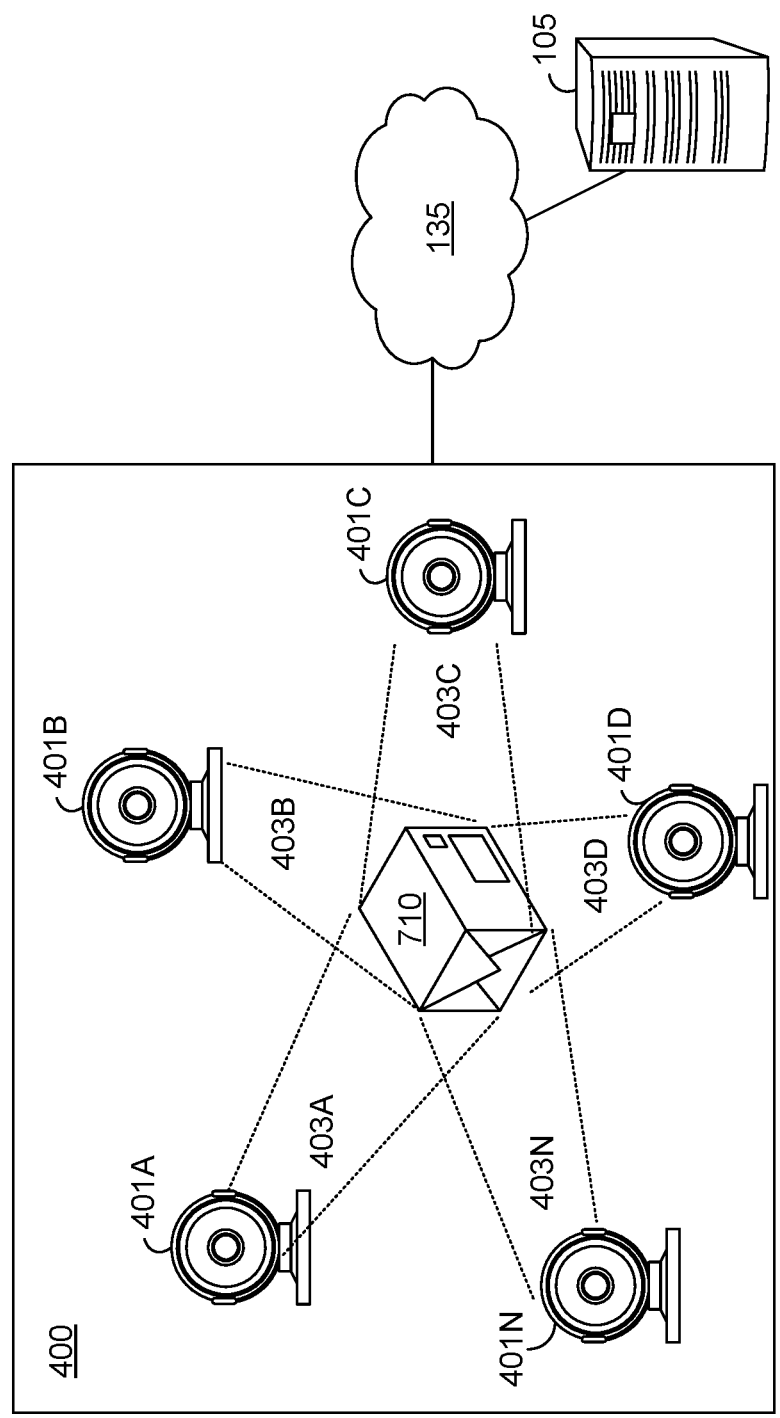
Figure 7:
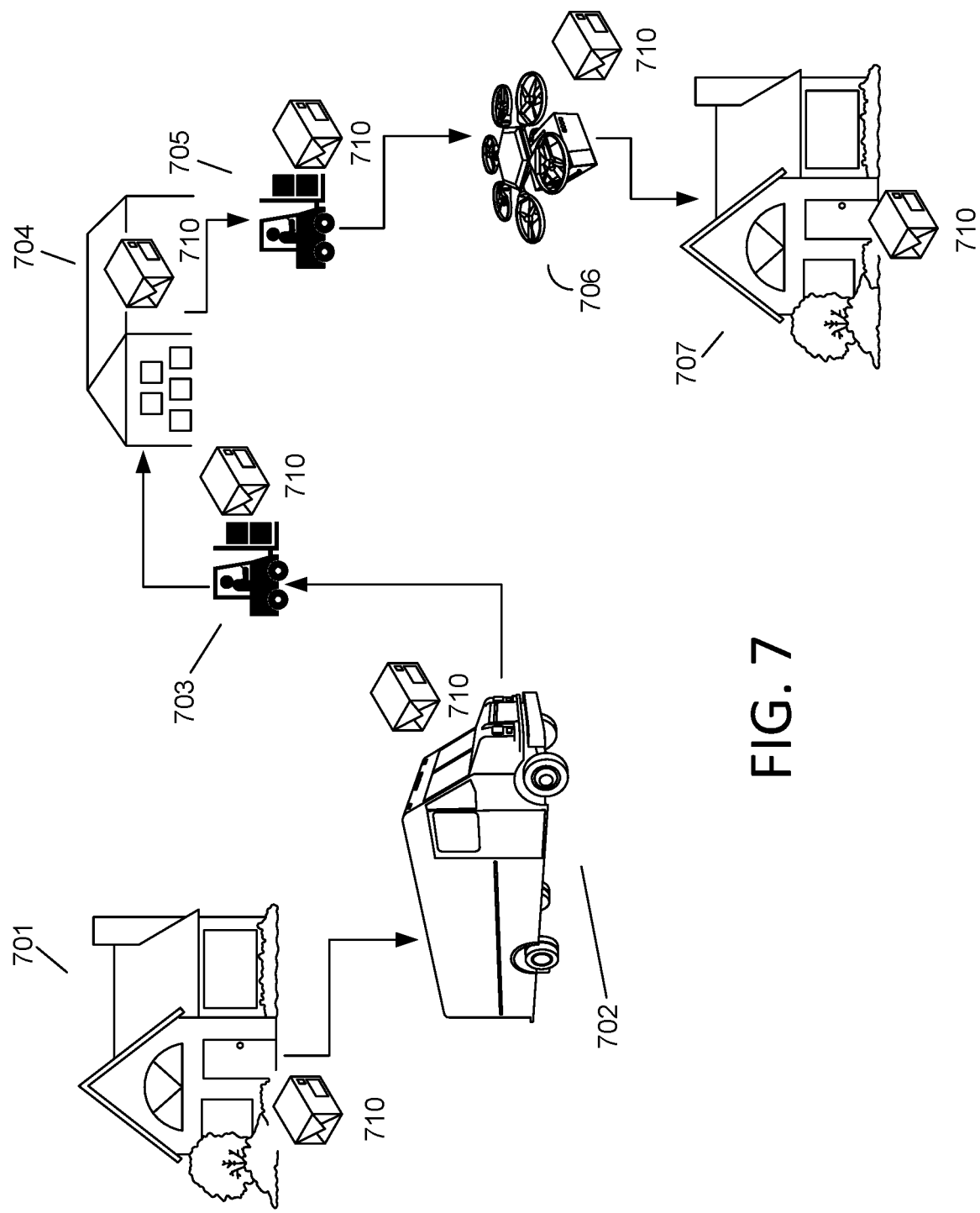
Figure 8A:
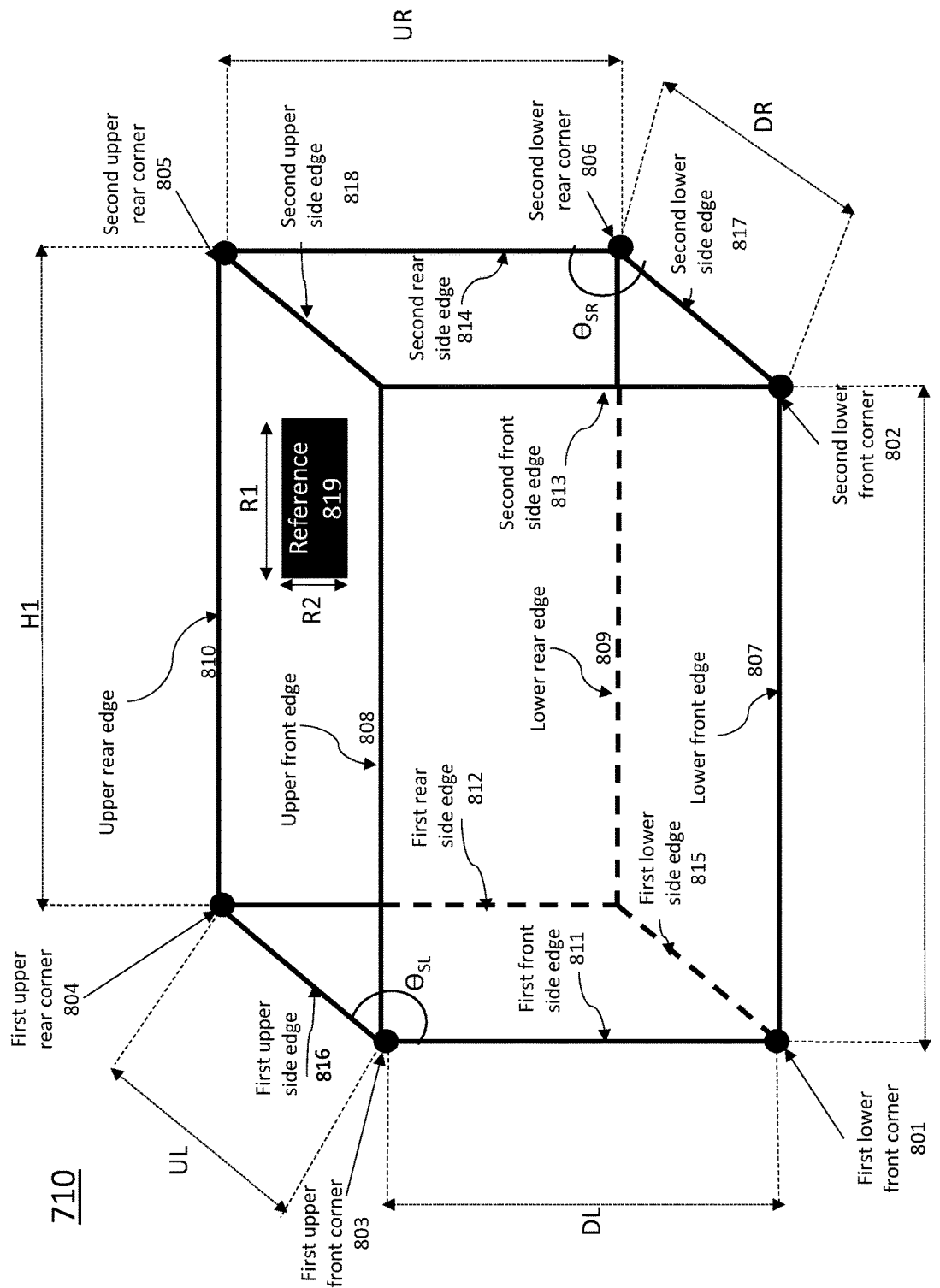
Figure 8B:
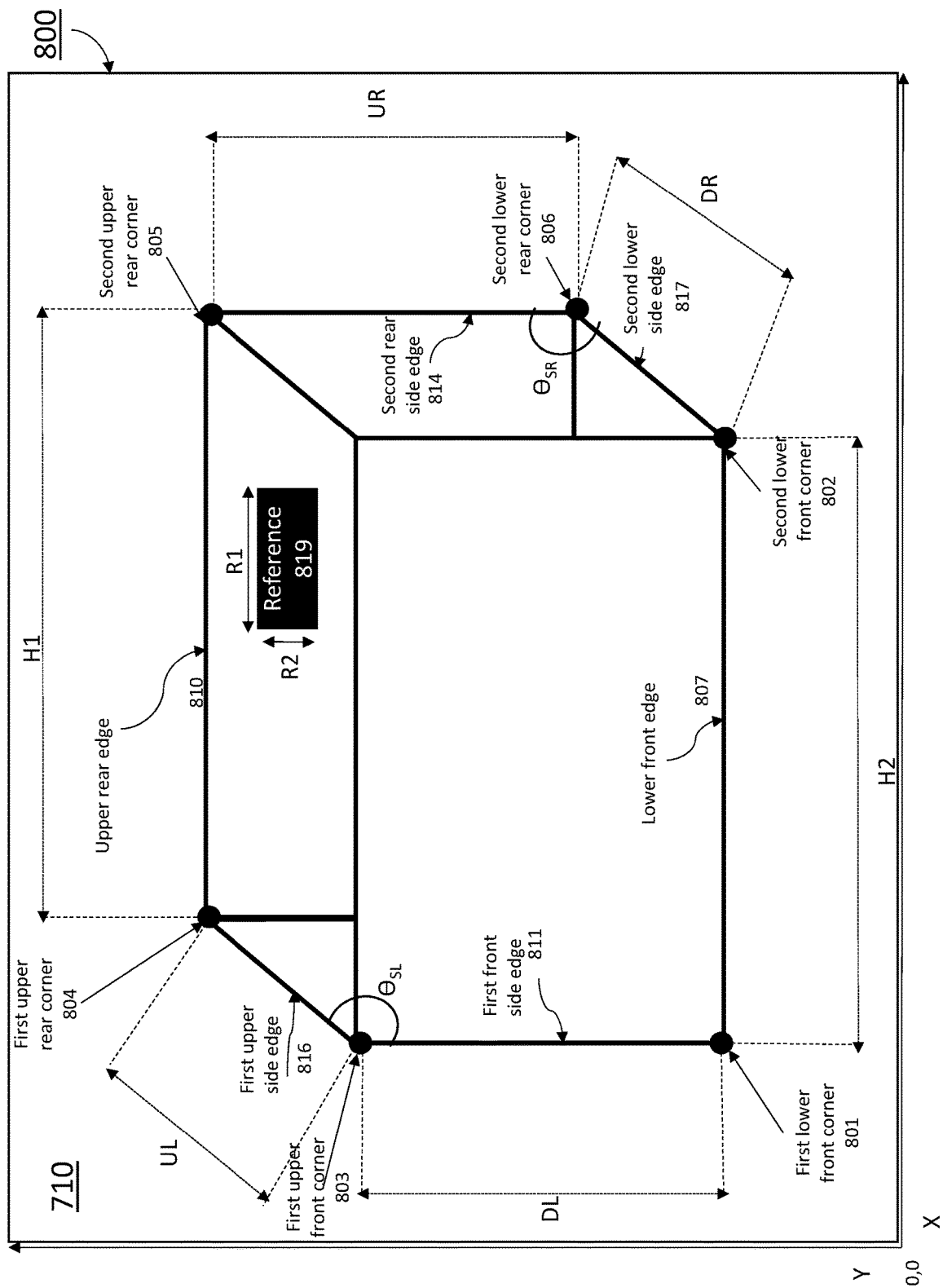
Figure 8C:
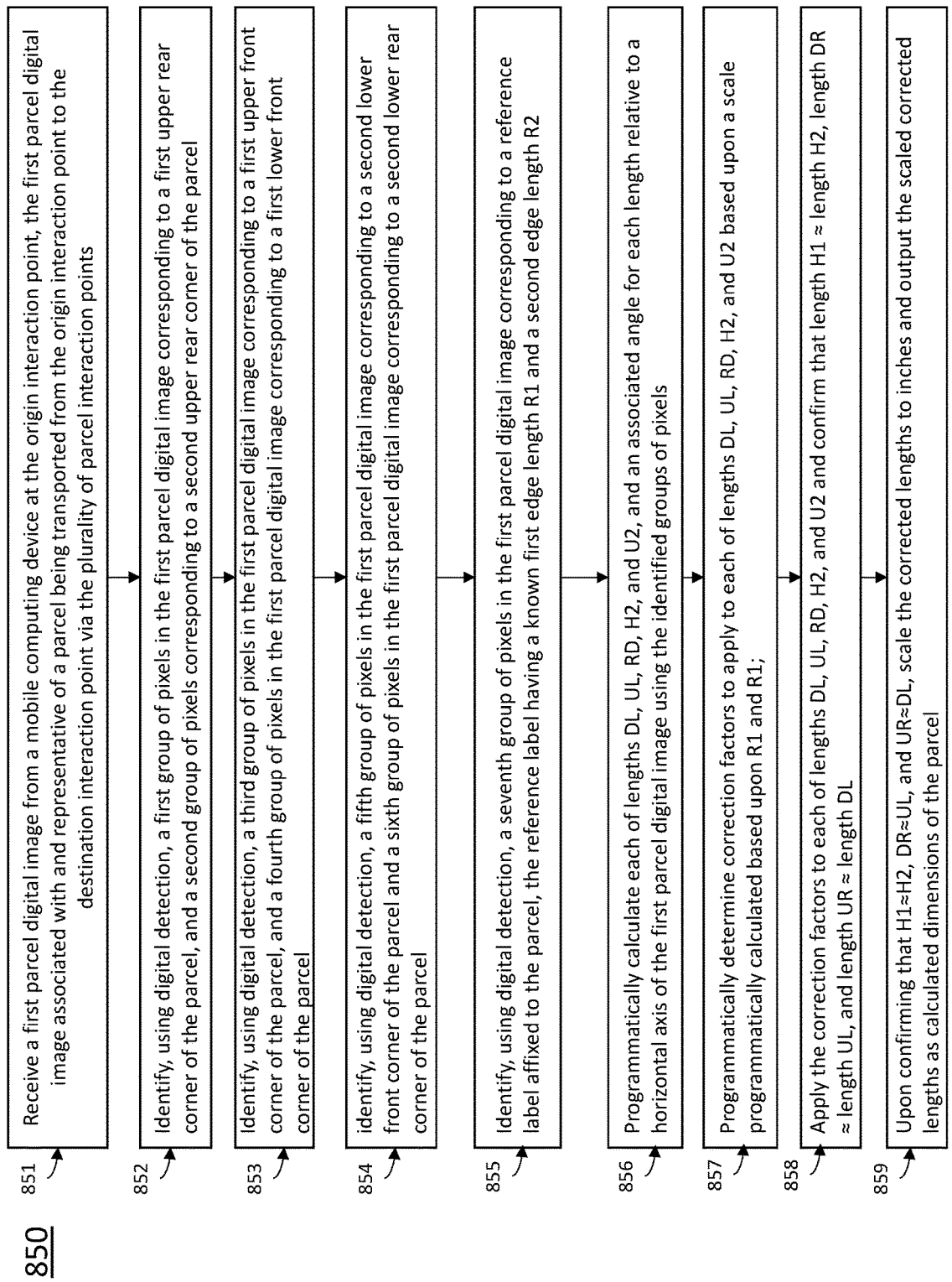
Figure 8D:
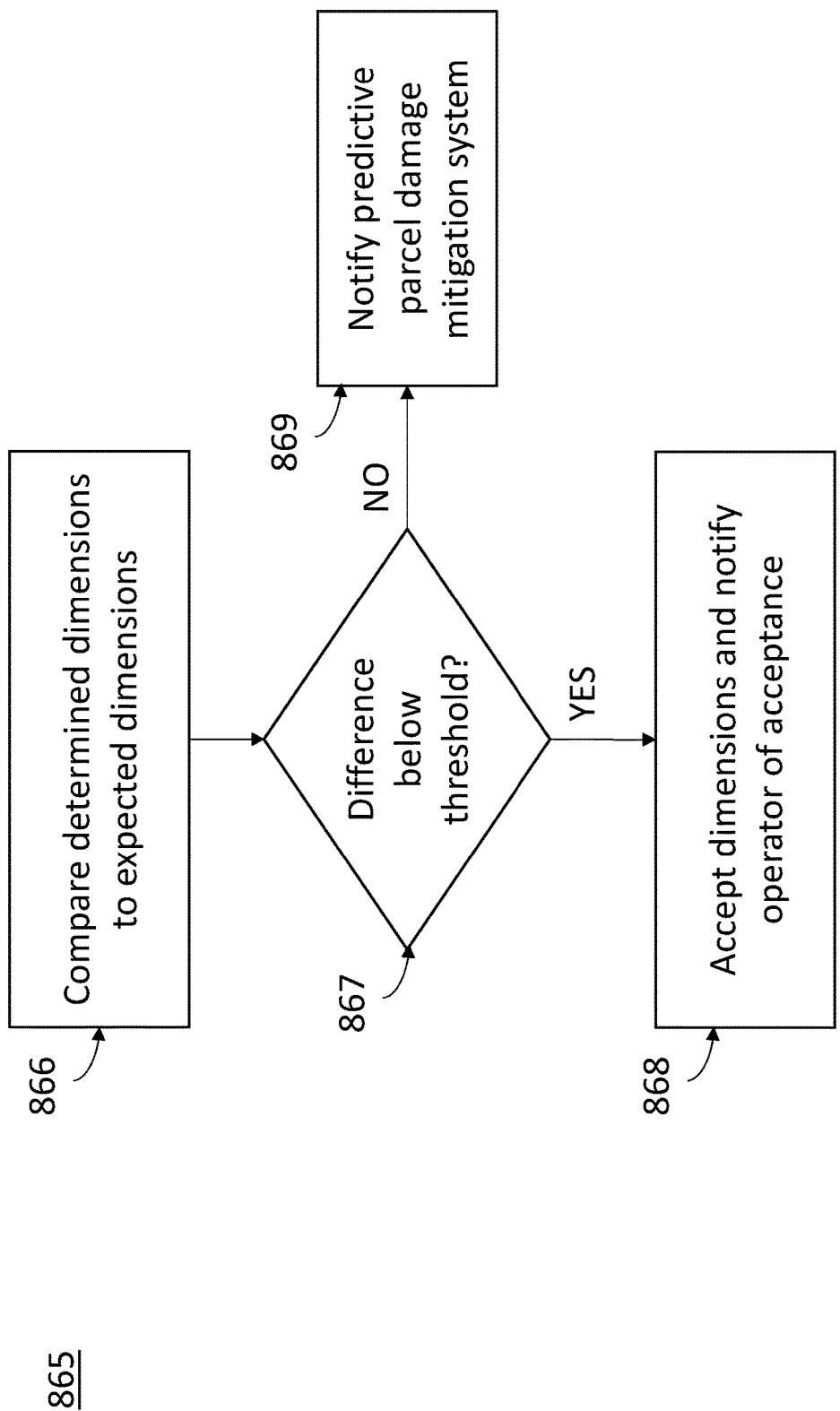

FIGS. 6A and 6B include an illustration of a conveying mechanism according to one embodiment of the present disclosure and an exemplary multi-view image capture system for use with embodiments of the present disclosure;

FIG. 7 illustrates an exemplary parcel transit route for use with embodiments of the present disclosure;

FIG. 8A illustrates an exemplary parcel for use with embodiments of the present disclosure;

FIG. 8B illustrates an exemplary parcel digital image for use with embodiments of the present disclosure;

FIG. 8C illustrates an exemplary process for use with embodiments of the present disclosure; and FIG. 8D illustrates an exemplary process for use with embodiments of the present disclosure.

DETAILED DESCRIPTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Computer Program Products, Methods, and Computing Entities

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary Definitions

As used herein, the terms "data," "content," "digital content," "digital content object," "information," and similar terms may be used interchangeably to refer to data capable of being transmitted, received, and/or stored in accordance with embodiments of the present disclosure. Thus, use of any such terms should not be taken to limit the spirit and scope of embodiments of the present disclosure. Further, where a computing device is described herein to receive data from another computing device, it will be appreciated that the data may be received directly from another computing device or may be received indirectly via one or more intermediary computing devices/entities, such as, for example, one or more servers, relays, routers, network access points, base stations, hosts, and/or the like, sometimes referred to herein as a "network." Similarly, where a computing device is described herein to transmit data to another computing device, it will be appreciated that the data may be sent directly to another computing device or may be sent indirectly via one or more intermediary computing devices/entities, such as, for example, one or more servers, relays, routers, network access points, base stations, hosts, and/or the like.

The term "parcel damage mitigation" refers to measures that a parcel transit network may employ to mitigate damage caused to parcels in transit while traversing the parcel transit network. Examples of parcel damage mitigation may include adjustment of temperature (or other environmental parameters) at a location within the parcel transit network, decommissioning (temporary or otherwise) of a conveyor belt or other vehicle within the parcel transit network, adjusting the speed of a conveyor belt or other vehicle within the parcel transit network, and the like.

The terms "parcel transit network," "carrier's logistic network," or "transportation and logistics network" refer to a series of one or more physical locations traversed by a parcel between an origin location and a destination location.

The term "origin interaction point" refers to a physical location within a parcel transit network or carrier's logistic network where a particular parcel is first encountered. Examples of origin interaction points include a residence, a transit network drop box, and a place of business.

The term "parcel interaction point" refers to a physical location within a parcel transit network or carrier's logistic network where any interaction with a particular parcel may occur. Interaction may be defined as any physical contact, including transfer from one location or vehicle to another. Examples of physical locations within the parcel transit network are outlined herein and are apparent to those skilled in the art.

The term "destination interaction point" refers to a physical location within a parcel transit network where a particular parcel is intended to be delivered. As such, the destination interaction point, in embodiments, is the final intended parcel interaction point along the traversal of the parcel transit network for the particular parcel.

The term "parcel digital image" refers to a digitally captured image representing one or more aspects of a particular parcel within a parcel transit network. In some embodiments, a parcel digital image of a particular parcel is captured using a digital camera. In other embodiments, a parcel digital image is captured using other means of capturing digital representations or the like of a particular parcel.

The terms "parcel," "item," and/or "shipment" refer to any tangible and/or physical object, such as a package, a container, a load, a crate, items banded together, an envelope, suitcases, vehicle parts, pallets, drums, vehicles, and the like sent through a delivery service from a first geographical location to one or more other geographical locations.

It should be appreciated that the term "programmatically expected" indicates machine prediction of occurrence of certain events.

As used herein, the term "likelihood" refers to a measure of probability for occurrence of a particular event.

The term "machine learning model" refers to a machine learning task. A machine learning model comprises a title and encompasses one or more target variables.

The term "machine learning model experiment" refers to a method for predicting the target variables that comprise a machine learning model. The machine learning model experiment represents a certain set of features provided to a certain algorithm with a certain set of hyper-parameters. A machine learning model experiment can have associated therewith a machine learning model experiment name and a machine learning model experiment description.

The terms "dataset" and "data set" refer to a collection of data. A data set can correspond to the contents of a single database table, or a single statistical data matrix, where every column of the table represents a particular variable, and each row corresponds to a given member of the data set in question. The data set can be comprised of tuples.

III. Exemplary System Architecture

Figure 1:
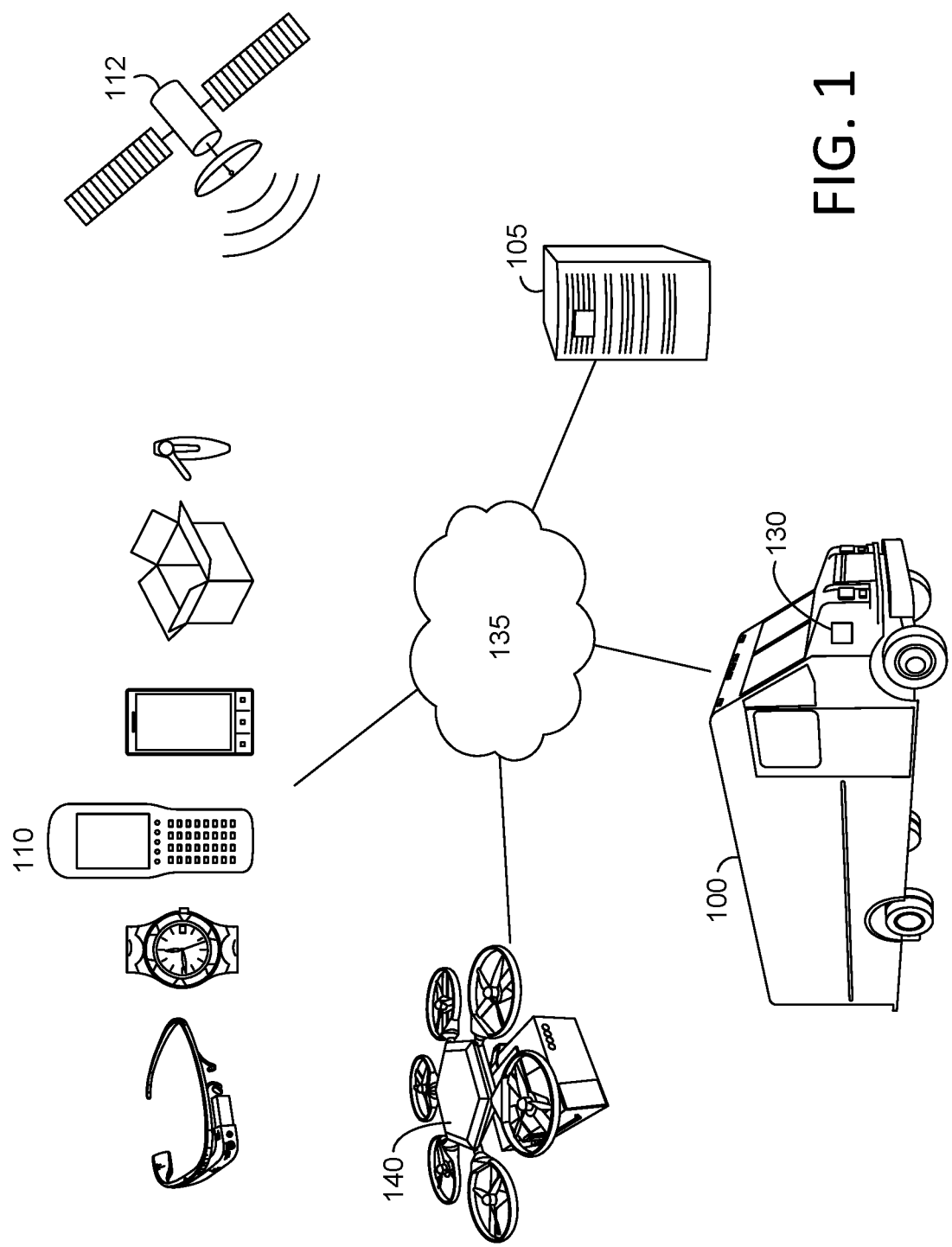

FIG. 1 provides an illustration of an exemplary embodiment of the present disclosure. As shown in FIG. 1, this particular embodiment may include one or more manual delivery vehicles 100, one or more analysis computing entities 105, one or more mobile computing entities 110, one or more satellites 112, one or more autonomous vehicles 140, one or more networks 135, and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

1. Exemplary Analysis Computing Entities

Figure 2:
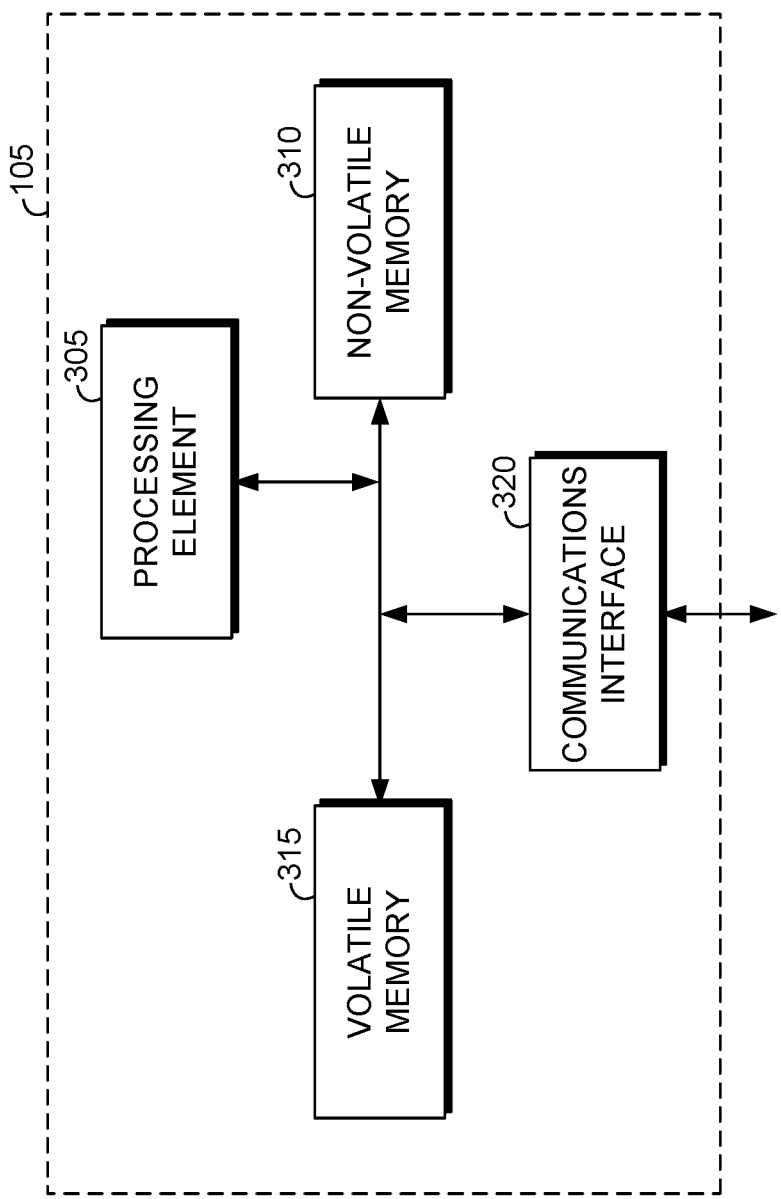

FIG. 2 provides a schematic of an analysis computing entity 105 according to one embodiment of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information/data, and/or similar terms used herein interchangeably.

As indicated, in one embodiment, the analysis computing entity 105 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in one embodiment, the analysis computing entity 105 may include or be in communication with one or more processing elements 205 (also referred to as processors, processing circuitry, and/or similar terms used herein interchangeably) that communicate with other elements within the analysis computing entity 105 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In one embodiment, the analysis computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the analysis computing entity 105 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the analysis computing entity 105 with the assistance of the processing element 205 and operating system.

As indicated, in one embodiment, the analysis computing entity 105 may also include one or more communications interfaces 220 for communicating with various computing entities, such as by communicating information/data/content, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the analysis computing entity 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the analysis computing entity 105 may include or be in communication with one or more input elements, such as a keyboard input, a mouse input, a touch screen/display input, motion input, movement input, audio input, pointing device input, joystick input, keypad input, and/or the like. The analysis computing entity 105 may also include or be in communication with one or more output elements (not shown), such as audio output, video output, screen/display output, motion output, movement output, and/or the like.

As will be appreciated, one or more of the analysis computing entity's 100 components may be located remotely from other analysis computing entity 105 components, such as in a distributed system. Furthermore, one or more of the components may be combined and additional components performing functions described herein may be included in the analysis computing entity 105. Thus, the analysis computing entity 105 can be adapted to accommodate a variety of needs and circumstances. As will be recognized, these architectures and descriptions are provided for exemplary purposes only and are not limiting to the various embodiments.

2. Exemplary Mobile Computing Entities

Mobile computing entities 110 may be configured for autonomous operation (e.g., in association with an autonomous vehicle 140) and/or for operation by a user (e.g., a vehicle operator, delivery personnel, customer, and/or the like). In certain embodiments, mobile computing entities 110 may be embodied as handheld computing entities, such as mobile phones, tablets, personal digital assistants, and/or the like, that may be operated at least in part based on user input received from a user via an input mechanism. Moreover, mobile computing entities 110 may be embodied as onboard vehicle computing entities, such as central vehicle electronic control units (ECUs), onboard multimedia systems, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, mobile computing entities 110 may be utilized as onboard controllers for UAVs configured for picking-up and/or delivering packages to various locations, and accordingly such mobile computing entities 110 may be configured to monitor various inputs (e.g., from various sensors) and generate various outputs (e.g., control instructions received by various vehicle drive mechanisms). It should be understood that various embodiments of the present disclosure may comprise a plurality of mobile computing entities 110 embodied in one or more forms (e.g., handheld mobile computing entities 110, vehicle-mounted mobile computing entities 110, and/or autonomous mobile computing entities 110).

Figure 3:
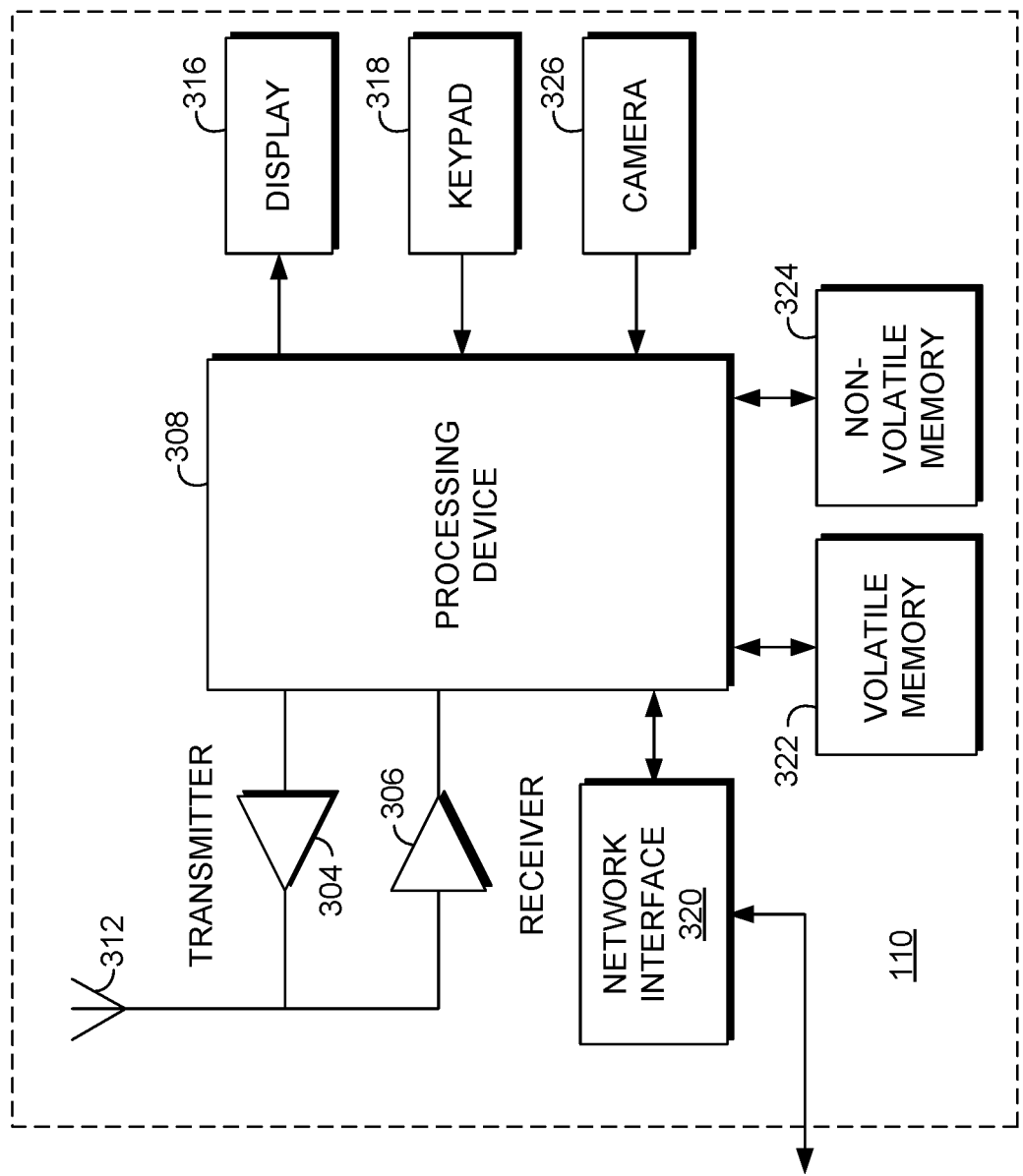

As will be recognized, a user may be an individual, a family, a company, an organization, an entity, a department within an organization, a representative of an organization and/or person, and/or the like—whether or not associated with a carrier. In one embodiment, a user may operate a mobile computing entity 110 that may include one or more components that are functionally similar to those of the analysis computing entity 105. FIG. 3 provides an illustrative schematic representative of a mobile computing entity 110 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, vehicle multimedia systems, autonomous vehicle onboard control systems, watches, glasses, key fobs, radio frequency identification (RFID) tags, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Mobile computing entities 110 can be operated by various parties, including carrier personnel (sorters, loaders, delivery drivers, network administrators, and/or the like). As shown in FIG. 3, the mobile computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the mobile computing entity 110 may be capable of operating with one or more air interface standards, communication protocols, modulation types, and access types. More particularly, the mobile computing entity 110 may operate in accordance with any of a number of wireless communication standards and protocols, such as those described above with regard to the analysis computing entity 105. In a particular embodiment, the mobile computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile computing entity 110 may operate in accordance with multiple wired communication standards and protocols, such as those described above with regard to the analysis computing entity 105 via a network interface 320.

Via these communication standards and protocols, the mobile computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The mobile computing entity 110 can also download changes, add-ons, and updates, for instance, to its firmware, software (e.g., including executable instructions, applications, program modules), and operating system.

According to one embodiment, the mobile computing entity 110 may include location determining aspects, devices, modules, functionalities, and/or similar words used herein interchangeably. For example, the mobile computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the mobile computing entity's 110 position in connection with a variety of other systems, including cellular towers, Wi-Fi access points, and/or the like. Similarly, the mobile computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The mobile computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the mobile computing entity 110 to interact with and/or cause display of information from the analysis computing entity 105, as described herein. The user input interface can comprise any of a number of devices or interfaces allowing the mobile computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the mobile computing entity 110 may also include a camera, imaging device, and/or similar words used herein interchangeably 326 (e.g., still-image camera, video camera, IoT enabled camera, IoT module with a low resolution camera, a wireless enabled MCU, and/or the like) configured to capture images. The mobile computing entity 110 may be configured to capture images via the onboard camera 326, and to store those imaging devices/cameras locally, such as in the volatile memory 322 and/or non-volatile memory 324. As discussed herein, the mobile computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata associated with the image data that may be accessible to various computing entities 110.

The mobile computing entity 110 may include other input mechanisms, such as scanners (e.g., barcode scanners), microphones, accelerometers, RFID readers, and/or the like configured to capture and store various information types for the mobile computing entity 110. For example, a scanner may be used to capture parcel/item/shipment information/data from an item indicator disposed on a surface of a shipment or other item. In certain embodiments, the mobile computing entity 110 may be configured to associate any captured input information/data, for example, via the onboard processing element 308. For example, scan data captured via a scanner may be associated with image data captured via the camera 326 such that the scan data is provided as contextual data associated with the image data.

The mobile computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the mobile computing entity 110. As indicated, this may include a user application that is resident on the entity or accessible through a browser or other user interface for communicating with the analysis computing entity 105 and/or various other computing entities.

In another embodiment, the mobile computing entity 110 may include one or more components or functionality that are the same or similar to those of the analysis computing entity 105, as described in greater detail above. As will be recognized, these architectures and descriptions are provided for exemplary purposes only and are not limiting to the various embodiments.

3. Exemplary Autonomous Vehicle

As utilized herein, autonomous vehicles 140 may be configured for transporting one or more shipments/items (e.g., one or more packages, parcels, bags, containers, loads, crates, items banded together, vehicle parts, pallets, drums, the like, and/or similar words used herein interchangeably). Various autonomous vehicles 140 may be configured as discussed in co-pending U.S. patent application Ser. No. 15/582,129, filed Apr. 28, 2017, and incorporated herein by reference in its entirety.

In certain embodiments, each autonomous vehicle 140 may be associated with a unique vehicle identifier (such as a vehicle ID) that uniquely identifies the autonomous vehicle 140. The unique vehicle ID may include characters, such as numbers, letters, symbols, and/or the like. For example, an alphanumeric vehicle ID (e.g., "AS445") may be associated with each vehicle 140. Although the autonomous vehicles 140 are discussed herein as comprising unmanned aerial vehicles (UAVs), it should be understood that the autonomous vehicles may comprise ground-based autonomous vehicles 140 in certain embodiments.

Figure 4:
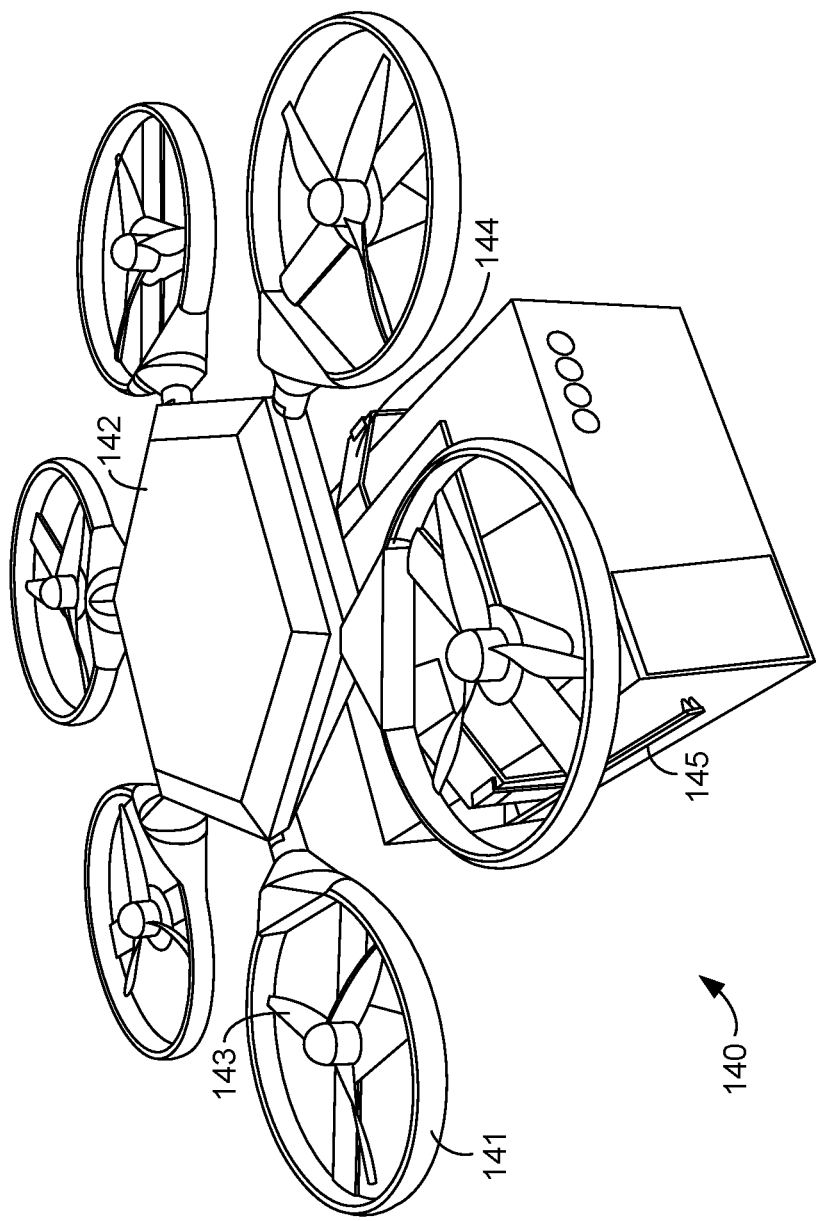
FIG. 4 illustrates an example autonomous vehicle that may be utilized in various embodiments.

FIG. 4 illustrates an example autonomous vehicle 140 that may be utilized in various embodiments. As shown in FIG. 4, the autonomous vehicle 140 is embodied as a UAV generally comprising a UAV chassis 142 and a plurality of propulsion members 143 extending outwardly from the UAV chassis 142 (in certain embodiments, the propulsion members are surrounded by propeller guards 141). The UAV chassis 142 generally defines a body of the UAV, which the propulsion members 143 (e.g., propellers having a plurality of blades configured for rotating within a propeller guard circumscribing the propellers) are configured to lift and guide during flight. According to various embodiments, the UAV chassis 142 may be formed from any material of suitable strength and weight (including sustainable and reusable materials), including but not limited to composite materials, aluminum, titanium, polymers, and/or the like, and can be formed through any suitable process.

In the embodiment depicted in FIG. 4, the autonomous vehicle 140 is a hexacopter and includes six separate propulsion members 143, each extending outwardly from the UAV chassis 142. However, as will be appreciated from the description herein, the autonomous vehicle 140 may include any number of propulsion members 143 suitable to provide lift and guide the autonomous vehicle 140 during flight. The propulsion members 143 are configured to enable vertical locomotion (e.g., lift) and/or horizontal locomotion, as shown in the example embodiment of FIG. 4, as well as enabling roll, pitch, and yaw movements of the autonomous vehicle 140. Although not shown, it should be understood that autonomous vehicles 140 may comprise any of a variety of propulsion mechanisms, such as balloon-based lift mechanisms (e.g., enabling lighter-than-air transportation), wing-based lift mechanisms, turbine-based lift mechanisms, and/or the like.

In the illustrated embodiment, the propulsion members 143 are electrically powered (e.g., by an electric motor that controls the speed at which the propellers rotate). However, as will be recognized, the propulsion members 143 may be powered by internal combustion engines (e.g., alcohol-fueled, oil-fueled, gasoline-fueled, and/or the like) driving an alternator, hydrogen fuel-cells, and/or the like.

Moreover, as shown in FIG. 4, the lower portion of the UAV chassis 142 is configured to receive and engage a parcel carrier 144 configured for selectively supporting a parcel/item/shipment to be delivered from a manual delivery vehicle 100 to a delivery destination. The parcel carrier 144 may define the lowest point of the autonomous vehicle 140 when secured relative to the chassis 142 of the autonomous vehicle 140, such that a parcel/item/shipment carried by the autonomous vehicle 140 may be positioned below the chassis of the autonomous vehicle 140 during transit. In certain embodiments, the parcel carrier 144 may comprise one or more parcel engagement arms 145 configured to detachably secure a parcel/item/shipment relative to the autonomous vehicle 140. In such embodiments, the parcel/item/shipment may be suspended by the parcel engagement arms 145 below the autonomous vehicle 140, such that it may be released from the autonomous vehicle 140 while the autonomous vehicle 140 hovers over a desired delivery destination. However, it should be understood that the parcel carrier 144 may have any of a variety of configurations enabling the autonomous vehicle 140 to support a parcel/item/shipment during transit. For example, the parcel carrier 144 may comprise a parcel cage for enclosing a parcel/item/shipment during transit, a parcel platform positioned above the UAV chassis 142, and/or the like.

In certain embodiments, the parcel carrier 144 may be detachably secured relative to the UAV chassis 142, for example, such that alternative parcel carriers 144 having shipments/items secured thereto may be alternatively connected relative to the UAV chassis 142 for delivery. In certain embodiments, a UAV may be configured to deliver a parcel/item/shipment secured within a parcel carrier 144, and return to a manual delivery vehicle 100 where the now-empty parcel carrier 144 (due to the delivery of the parcel/item/shipment that was previously secured therein) may be detached from the autonomous vehicle 140 and a new parcel carrier 144 having a second parcel/item/shipment may be secured to the UAV chassis 142.

Figure 5:
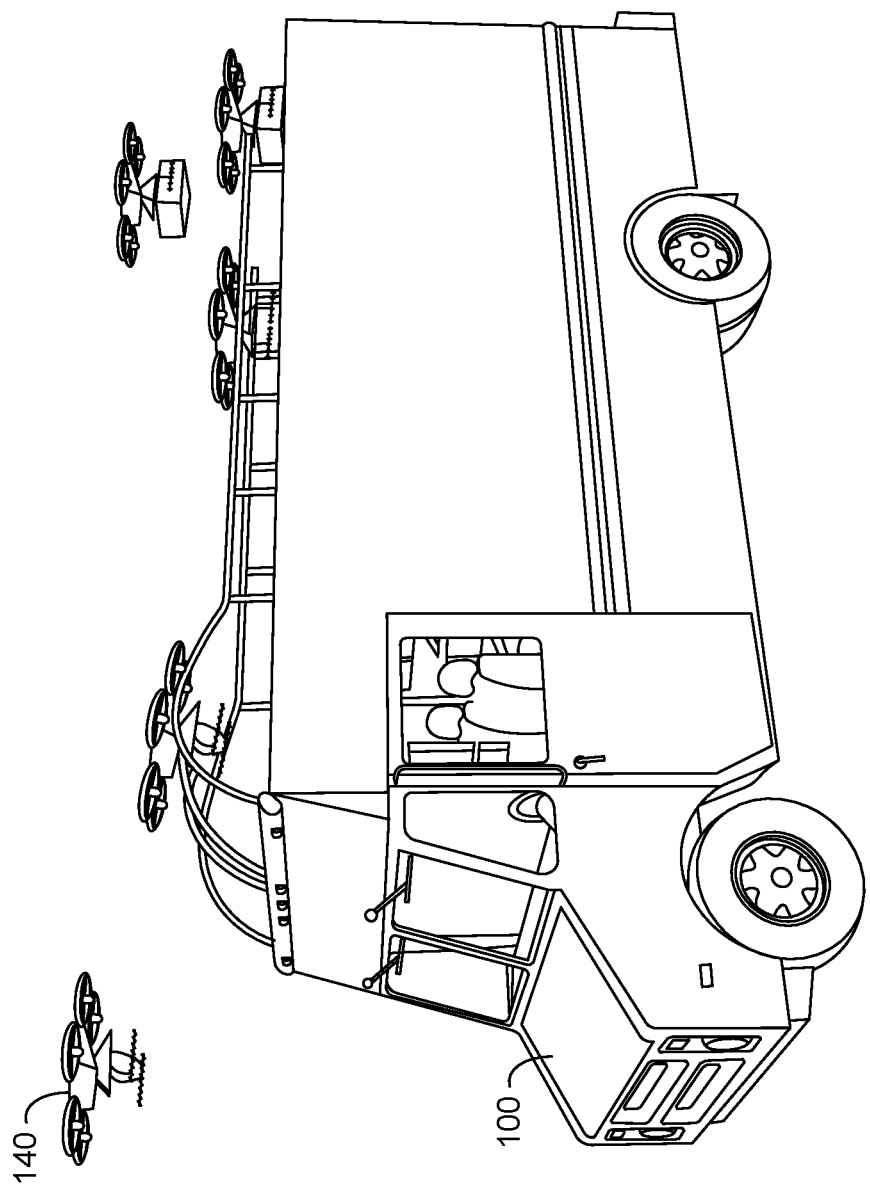
FIG. 5 illustrates an example manual delivery vehicle according to various embodiments.

As indicated by FIG. 5, which illustrates an example manual delivery vehicle 100 according to various embodiments, the autonomous vehicle 140 may be configured to selectively engage a portion of the manual delivery vehicle 100 such that the manual delivery vehicle 100 may transport the autonomous vehicle 140. For example, the UAV chassis 142 may be configured to engage one or more vehicle guide mechanisms secured relative to the manual delivery vehicle 100 to detachably secure the autonomous vehicle 140 relative to the manual delivery vehicle 100 when not delivering shipments/items. As discussed herein, the guide mechanism of a manual delivery vehicle 100 may be configured to enable an autonomous vehicle 140 to autonomously take-off from the manual delivery vehicle 100 to initiate a delivery activity and/or to autonomously land at the manual delivery vehicle 100 to conclude a delivery activity.

Moreover, the autonomous vehicle 140 additionally comprises an onboard control system embodied as a mobile computing entity 110 that includes a plurality of sensing devices that assist in navigating autonomous vehicle 140 during flight. For example, the control system is configured to control movement of the vehicle, navigation of the vehicle, obstacle avoidance, item delivery, and/or the like. Although not shown, the control system may additionally comprise one or more user interfaces, which may comprise an output mechanism and/or an input mechanism configured to receive user input. For example, the user interface may be configured to enable autonomous vehicle technicians to review diagnostic information/data relating to the autonomous vehicle 140, and/or a user of the autonomous vehicle 140 may utilize the user interface to input and/or review information/data indicative of a destination location for the autonomous vehicle 140.

The plurality of sensing devices are configured to detect objects around the autonomous vehicle 140 and provide feedback to an autonomous vehicle onboard control system to assist in guiding the autonomous vehicle 140 in the execution of various operations, such as takeoff, flight navigation, and landing, as will be described in greater detail herein. In certain embodiments, the autonomous vehicle control system comprises a plurality of sensors including ground landing sensors, vehicle landing sensors, flight guidance sensors, and one or more imaging devices/cameras. The vehicle landing sensors may be positioned on a lower portion of the UAV chassis 142 and assist in landing the autonomous vehicle 140 on a manual delivery vehicle 100 (e.g., as shown in FIG. 5) as will be described in greater detail herein. The vehicle landing sensors may include one or more imaging devices/cameras (e.g., video imaging devices/cameras and/or still imaging devices/cameras), one or more altitude sensors (e.g., Light Detection and Ranging (LIDAR) sensors, laser-based distance sensors, infrared distance sensors, ultrasonic distance sensors, optical sensors, and/or the like). Being located on the lower portion of the UAV chassis 142, the vehicle landing sensors are positioned below the propulsion members 143 and have a line of sight with the manual delivery vehicle's UAV support mechanism (FIG. 5) when the autonomous vehicle 140 approaches the manual delivery vehicle 100 during landing.

The autonomous vehicle's one or more imaging devices/cameras may also be positioned on the lower portion of the UAV chassis 142, on propeller guards 141, and/or the like. The one or more imaging devices/cameras may include video and/or still imaging devices/cameras, and may capture images and/or video of the flight of the autonomous vehicle 140 during a delivery process, and may assist in verifying or confirming delivery of a parcel/shipment to a destination, as will be described in greater detail herein. Being located on the lower portion of the UAV chassis 142, the one or more imaging devices/cameras are positioned below the propulsion members 143 and have an unobstructed line of sight to view the flight of the autonomous vehicle 140. Moreover, as discussed specifically in reference to the various mobile computing entities 110, the one or more imaging devices/cameras disposed on the UAV may be configured for capturing images of one or more items/shipments before picking-up those items/shipments, after dropping off those items/shipments, during transit of the items/shipments, and/or the like.

In various embodiments, the control system of the autonomous vehicle 140 may encompass, for example, an information/data collection device similar to information/data collection device 130 discussed in reference to a manual delivery vehicle 100 or other computing entities.

In one embodiment, the information/data collection device 130 may include, be associated with, or be in wired or wireless communication with one or more processors (various exemplary processors are described in greater detail below), one or more location-determining devices or one or more location sensors (e.g., Global Navigation Satellite System (GNSS) sensors, indoor location sensors, such as Bluetooth sensors, Wi-Fi sensors, and/or the like), one or more real-time clocks, a J-Bus protocol architecture, one or more electronic control modules (ECM), one or more communication ports for receiving information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components may be located in the autonomous vehicle 140 but external to the information/data collection device 130.

In one embodiment, the one or more location sensors, modules, or similar words used herein interchangeably may be one of several components in wired or wireless communication with or available to the information/data collection device 130. Moreover, the one or more location sensors may be compatible with GPS satellites 112, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like.

As discussed herein, triangulation and/or proximity based location determinations may be used in connection with a device associated with a particular autonomous vehicle 140 and with various communication points (e.g., cellular towers, Wi-Fi access points, and/or the like) positioned at various locations throughout a geographic area to monitor the location of the vehicle 100 and/or its operator. The one or more location sensors may be used to receive latitude, longitude, altitude, heading or direction, geocode, course, position, time, location identifying information/data, and/or speed information/data (e.g., referred to herein as location information/data and further described herein below). The one or more location sensors may also communicate with the analysis computing entity 105, the information/data collection device 130, mobile computing entity 110, and/or similar computing entities.

In one embodiment, the ECM may be one of several components in communication with and/or available to the information/data collection device 130. The ECM, which may be a scalable and subservient device to the information/data collection device 130, may have information/data processing capability to decode and store analog and digital inputs received from, for example, vehicle systems and sensors. The ECM may further have information/data processing capability to collect and present location information/data to the J-Bus (which may allow transmission to the information/data collection device 130), and output location identifying information/data, for example, via a display and/or other output device (e.g., a speaker).

As indicated, a communication port may be one of several components available in the information/data collection device 130 (or be in or as a separate computing entity). Embodiments of the communication port may include an Infrared information/data Association (IrDA) communication port, an information/data radio, and/or a serial port. The communication port may receive instructions for the information/data collection device 130. These instructions may be specific to the vehicle 100 in which the information/data collection device 130 is installed, specific to the geographic area and/or serviceable point to which the vehicle 100 will be traveling, specific to the function the vehicle serves within a fleet, and/or the like. In one embodiment, the information/data radio may be configured to communicate with a WWAN, WLAN, WPAN, or any combination thereof. For example, the information/data radio may communicate via various wireless protocols, such as 802.11, GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols (including BLE), wireless USB protocols, and/or any other wireless protocol. As yet other examples, the communication port may be configured to transmit and/or receive information/data transmissions via light-based communication protocols (e.g., utilizing specific light emission frequencies, wavelengths (e.g., visible light, infrared light, and/or the like), and/or the like to transmit data), via sound-based communication protocols (e.g., utilizing specific sound frequencies to transmit data), and/or the like.

4. Exemplary Manual Delivery Vehicle

As discussed herein, a manual delivery vehicle 100 may be a user (e.g., human) operable delivery vehicle configured for transporting a vehicle operator, a plurality of items, and one or more autonomous vehicles 140 along a delivery route. However, it should be understood that in certain embodiments, even though the term manual delivery vehicle 100 is used, this is simply to distinguish it in the description from the autonomous vehicle 140. Thus, the manual delivery vehicle 100 may itself be autonomous or semi-autonomous. In certain embodiments, an autonomous manual delivery vehicle 100 may be configured as an autonomous base vehicle configured to carry a plurality of items, one or more smaller, auxiliary autonomous vehicles (e.g., autonomous vehicles 140 described in detail herein), a human delivery personnel (e.g., who may complete various deliveries from the manual delivery vehicle 100 to respective destination locations), and/or the like. For example, a vehicle 100 may be a manned or an unmanned tractor, truck, car, motorcycle, moped, Segway, bicycle, golf cart, hand truck, cart, trailer, tractor and trailer combination, van, flatbed truck, vehicle, drone, airplane, helicopter, boat, barge, and/or any other form of object for moving or transporting people, UAVs, and/or shipments/items (e.g., one or more packages, parcels, bags, containers, loads, crates, items banded together, vehicle parts, pallets, drums, the like, and/or similar words used herein interchangeably). In one embodiment, each vehicle 100 may be associated with a unique vehicle identifier (such as a vehicle ID) that uniquely identifies the vehicle 100. The unique vehicle ID (e.g., trailer ID, tractor ID, vehicle ID, and/or the like) may include characters, such as numbers, letters, symbols, and/or the like. For example, an alphanumeric vehicle ID (e.g., "AS445") may be associated with each vehicle 100. In another embodiment, the unique vehicle ID may be the license plate, registration number, or other identifying information/data assigned to the vehicle 100. In various embodiments, the manual delivery vehicle 100 may be configured as discussed in co-pending U.S. patent application Ser. No. 15/582,129, filed Apr. 28, 2017, and incorporated herein by reference in its entirety.

In various embodiments, the manual delivery vehicle 100 comprises one or more autonomous vehicle support mechanisms, as shown in FIG. 5. The autonomous vehicle support mechanisms may be configured to enable the autonomous vehicles 140 to launch and land at the manual delivery vehicle 100 while completing autonomous deliveries. In certain embodiments, the autonomous vehicle support mechanisms may be configured to enable the autonomous vehicles 140 to launch and/or land while the manual delivery vehicle 100 is moving, however certain embodiments may be configured to enable autonomous vehicle 140 launching and/or landing while the manual delivery vehicle 100 is stationary.

Moreover, although not shown, the interior of the manual delivery vehicle 100 may comprise a cargo area configured for storing a plurality of items, a plurality of autonomous vehicles 140, a plurality of autonomous vehicle components, and/or the like. In certain embodiments, items designated for autonomous delivery may be stored in one or more autonomously operated storage assemblies within the cargo area of the manual delivery vehicle 100. When a particular parcel/item/shipment is identified as ready for delivery, the storage assembly autonomously delivers the parcel/item/shipment to an autonomous vehicle 140 for delivery.

Moreover, the manual delivery vehicle 100 may comprise and/or be associated with one or more mobile computing entities 110, devices, and/or similar words used herein interchangeably. The mobile computing entities 110 may comprise, for example, an information/data collection device 130 or other computing entities.

In one embodiment, the information/data collection device 130 may include, be associated with, or be in wired or wireless communication with one or more processors (various exemplary processors are described in greater detail below), one or more location-determining devices or one or more location sensors (e.g., GNSS sensors), one or more telematics sensors, one or more real-time clocks, a J-Bus protocol architecture, one or more ECMs, one or more communication ports for receiving telematics information/data from various sensors (e.g., via a CAN-bus), one or more communication ports for transmitting/sending information/data, one or more RFID tags/sensors, one or more power sources, one or more information/data radios for communication with a variety of communication networks, one or more memory modules, and one or more programmable logic controllers (PLC). It should be noted that many of these components may be located in the vehicle 100 but external to the information/data collection device 130.

In one embodiment, the one or more location sensors, modules, or similar words used herein interchangeably may be one of several components in wired or wireless communication with or available to the information/data collection device 130. Moreover, the one or more location sensors may be compatible with GPS satellites 112, LEO satellite systems, DOD satellite systems, the European Union Galileo positioning systems, the Chinese Compass navigation systems, Indian Regional Navigational satellite systems, and/or the like, as discussed above in reference to the autonomous delivery vehicle. Alternatively, triangulation may be used in connection with a device associated with a particular vehicle and/or the vehicle's operator and with various communication points (e.g., cellular towers or Wi-Fi access points) positioned at various locations throughout a geographic area to monitor the location of the vehicle 100 and/or its operator. The one or more location sensors may be used to receive latitude, longitude, altitude, heading or direction, geocode, course, position, time, and/or speed information/data (e.g., referred to herein as telematics information/data and further described herein below). The one or more location sensors may also communicate with the analysis computing entity 105, the information/data collection device 130, mobile computing entity 110, and/or similar computing entities.

In one embodiment, the ECM may be one of several components in communication with and/or available to the information/data collection device 130. The ECM, which may be a scalable and subservient device to the information/data collection device 130, may have information/data processing capability to decode and store analog and digital inputs from vehicle systems and sensors (e.g., location sensor). The ECM may further have information/data processing capability to collect and present collected information/data to the J-Bus (which may allow transmission to the information/data collection device 130).

As indicated, a communication port may be one of several components available in the information/data collection device 130 (or be in or as a separate computing entity). Embodiments of the communication port may include an IrDA communication port, an information/data radio, and/or a serial port. The communication port may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio may be configured to communicate with WWAN, WLAN, WPAN, or any combination thereof, as discussed in reference to the autonomous vehicle, above.

5. Exemplary Parcel/Item/Shipment

In one embodiment, each parcel/item/shipment may include and/or be associated with a parcel/item/shipment identifier, such as an alphanumeric identifier. Such parcel/item/shipment identifiers may be represented as text, barcodes, tags, character strings, Aztec Codes, MaxiCodes, information/data Matrices, Quick Response (QR) Codes, electronic representations, and/or the like. A unique parcel/item/shipment identifier (e.g., 123456789) may be used by the carrier to identify and track the parcel/item/shipment as it moves through the carrier's transportation network and to associate a particular physical parcel/item/shipment with an electronically stored parcel/item/shipment profile. For example, the parcel/item/shipment profile may be stored in a parcel/item/shipment level detail database, and may store data informing various carrier personnel and/or delivery vehicles (e.g., autonomous vehicle 140) of delivery-related information/data specific to a particular shipment. Further, such parcel/item/shipment identifiers can be affixed to shipments/items by, for example, using a sticker (e.g., label) with the unique parcel/item/shipment identifier printed thereon (in human and/or machine readable form) or an RFID tag with the unique parcel/item/shipment identifier stored therein. Such items may be referred to as "connected" shipments/items and/or "non-connected" shipments/items.

In one embodiment, connected shipments/items include the ability to determine their locations and/or communicate with various computing entities. This may include the parcel/item/shipment being able to communicate via a chip or other devices, such as an integrated circuit chip, RFID technology, NFC technology, Bluetooth technology, Wi-Fi technology, light-based communication protocols, sound-based communication protocols, and any other suitable communication techniques, standards, or protocols with one another and/or communicate with various computing entities for a variety of purposes. Connected shipments/items may include one or more components that are functionally similar to those of the analysis computing entity 105 and/or mobile computing entity 110 as described herein. For example, in one embodiment, each connected parcel/item/shipment may include one or more processing elements, one or more display device/input devices (e.g., including user interfaces), volatile and non-volatile storage or memory, and/or one or more communications interfaces. In this regard, in some example embodiments, a parcel/item/shipment may communicate send "to" address information/data, received "from" address information/data, unique identifier codes, location information/data, status information/data, and/or various other information/data.

In one embodiment, non-connected shipments/items do not typically include the ability to determine their locations and/or might not be able to communicate with various computing entities or are not designated to do so by the carrier. The location of non-connected shipments/items can be determined with the aid of other appropriate computing entities. For example, non-connected shipments/items can be scanned (e.g., affixed barcodes, RFID tags, and/or the like) or have the containers or vehicles in which they are located scanned or located. As will be recognized, an actual scan or location determination of a parcel/item/shipment is not necessarily required to determine the location of a parcel/item/shipment. That is, a scanning operation might not actually be performed on a label affixed directly to a parcel/item/shipment or location determination might not be made specifically for or by a parcel/item/shipment. For example, a label on a larger container housing many shipments/items can be scanned, and by association, the location of the shipments/items housed within the container are considered to be located in the container at the scanned location. Similarly, the location of a vehicle transporting many shipments/items can be determined, and by association, the location of the shipments/items being transported by the vehicle are considered to be located in the vehicle 100 at the determined location. These can be referred to as "logical" scans/determinations or "virtual" scans/determinations. Thus, the location of the shipments/items is based on the assumption they are within the container or vehicle, despite the fact that one or more of such shipments/items might not actually be there.

6. Exemplary Parcel/Item/Shipment Profile

As noted herein, various shipments/items may have an associated parcel/item/shipment profile, record, and/or similar words used herein interchangeably stored in a parcel/item/shipment detail database. The parcel/item/shipment profile may be utilized by the carrier to track the current location of the parcel/item/shipment and to store and retrieve information/data about the parcel/item/shipment. For example, the parcel/item/shipment profile may comprise electronic data corresponding to the associated parcel/item/shipment, and may identify various shipping instructions for the parcel/item/shipment, various characteristics of the parcel/item/shipment, and/or the like. The electronic data may be in a format readable by various computing entities, such as an analysis computing entity 105, a mobile computing entity 110, an autonomous vehicle control system, and/or the like. However, it should be understood that a computing entity configured for selectively retrieving electronic data within various parcel/item/shipment profiles may comprise a format conversion aspect configured to reformat requested data to be readable by a requesting computing entity.

In various embodiments, the parcel/item/shipment profile comprises identifying information/data corresponding to the parcel/item/shipment. The identifying information/data may comprise information/data identifying the unique parcel/item/shipment identifier associated with the parcel/item/shipment. Accordingly, upon providing the identifying information/data to the parcel/item/shipment detail database, the parcel/item/shipment detail database may query the stored parcel/item/shipment profiles to retrieve the parcel/item/shipment profile corresponding to the provided unique identifier.

Moreover, the parcel/item/shipment profiles may comprise shipping information/data for the parcel/item/shipment. For example, the shipping information/data may identify an origin location (e.g., an origin serviceable point), a destination location (e.g., a destination serviceable point), a service level (e.g., Next Day Air, Overnight, Express, Next Day Air Early AM, Next Day Air Saver, Jetline, Sprintline, Secureline, 2nd Day Air, Priority, 2nd Day Air Early AM, 3 Day Select, Ground, Standard, First Class, Media Mail, SurePost, Freight, and/or the like), whether a delivery confirmation signature is required, and/or the like. In certain embodiments, at least a portion of the shipping information/data may be utilized as identifying information/data to identify a parcel/item/shipment. For example, a destination location may be utilized to query the parcel/item/shipment detail database to retrieve data about the parcel/item/shipment.

In certain embodiments, the parcel/item/shipment profile comprises characteristic information/data identifying parcel/item/shipment characteristics. For example, the characteristic information/data may identify dimensions of the parcel/item/shipment (e.g., length, width, and height), a weight of the parcel/item/shipment, contents of the parcel/item/shipment, and/or the like. In certain embodiments, the contents of the parcel/item/shipment may comprise a precise listing of the contents of the parcel/item/shipment (e.g., three widgets) and/or the contents may identify whether the parcel/item/shipment contains any hazardous materials (e.g., the contents may indicate whether the parcel/item/shipment contains one or more of the following: no hazardous materials, toxic materials, flammable materials, pressurized materials, controlled substances, firearms, and/or the like).

7. Exemplary Conveying Mechanism

As shipments/items are moved through a carrier's logistics network between corresponding origins and destinations, those shipments/items may pass through one or more carrier sort locations. Each carrier sort location may comprise one or more conveying mechanisms (e.g., conveyor belts, chutes, and/or the like) configured to move shipments/items between incoming locations (e.g., incoming vehicles) to corresponding outbound vehicles destined for later locations along a parcel/item/shipment's intended transportation path between the origin and destination.

FIG. 6 includes an illustration of a conveying mechanism 115 according to one embodiment of the present disclosure.

As shown in FIGS. 6A and 6B, the conveying mechanism 115 may comprise a multi-view image capture system 400 (comprising one or more image/acquisition devices 401 and/or similar words used herein interchangeably) for acquiring information/data (including image information/data) from a parcel/item/shipment. As mentioned herein, each parcel/item/shipment may include a parcel/item/shipment identifier, such as an alphanumeric identifier. Such parcel/item/shipment identifiers may be represented as text, barcodes, Aztec Codes, MaxiCodes, Data Matrices, Quick Response (QR) Codes, electronic representations, tags, character strings, and/or the like. The unique parcel/item/shipment identifier (e.g., 123456789) may be used by the carrier to identify and track the parcel/item/shipment as it moves through the carrier's transportation network. Further, such parcel/item/shipment identifiers can be affixed to items by, for example, using a sticker (e.g., label) with the unique parcel/item/shipment identifier printed thereon (in human and/or machine readable form) or an RFID tag with the unique parcel/item/shipment identifier stored therein. Accordingly, the one or more image/acquisition devices 401 may be capable of acquiring data (including parcel/item/shipment identifiers) relevant to each parcel/item/shipment, including parcel/item/shipment identifier information/data, parcel/item/shipment condition information/data, and/or the like for shipments/items traveling along a corresponding conveying mechanism 115 (e.g., conveyor belt, slide, chute, bottle conveyor, open or enclosed track conveyor, I-beam conveyor, cleated conveyor, and/or the like).

As indicated, the image/acquisition devices 401 may be part of a multi-view image capture system 400 configured to capture images (e.g., image information/data) of shipments/items (and/or parcel/item/shipment identifiers) moving along the conveying mechanism 115. For example, the image/acquisition device 401 may include or be associated with a video camera, camcorder, still camera, web camera, Single-Lens Reflex (SLR) camera, high-speed camera, and/or the like. In various embodiments, the image/acquisition device 401 may be configured to record high-resolution image data and/or to capture image data at a high speed (e.g., utilizing a frame rate of at least 60 frames per second). Alternatively, the image/acquisition device 401 may be configured to record low-resolution image data (e.g., images comprising less than 480 horizontal scan lines) and/or to capture image data at a low speed (e.g., utilizing a frame rate less than 60 frames per second). As will be understood by those skilled in the art, the image/acquisition device 401 may be configured to operate with various combinations of the above features (e.g., capturing images with less than 480 horizontal scan lines and utilizing a frame rate of at least 60 frames per second, or capturing images with at least 480 horizontal scan lines and utilizing a frame rate less than 60 frames per second). In various embodiments, the image/acquisition device 401 may be configured to capture image data of the shipments/items and conveying mechanism 115 of sufficient quality that a user viewing the image data on the display can identify each parcel/item/shipment represented in the displayed image data. For example, in embodiments wherein the conveying mechanism 115 and shipments/items are moving at a high rate of speed, the image/acquisition device 401 may be configured to capture image data at a high speed. As will be recognized, the image data can be captured in or converted to a variety of formats, such as Joint Photographic Experts Group (JPEG), Motion JPEG (MJPEG), Moving Picture Experts Group (MPEG), Graphics Interchange Format (GIF), Portable Network Graphics (PNG), Tagged Image File Format (TIFF), bitmap (BMP), H.264, H.263, Flash Video (FLV), Hypertext Markup Language 5 (HTML5), VP6, VP8, and/or the like. In certain embodiments, various features (e.g., text, objects of interest, codes, parcel/item/shipment identifiers, and/or the like) can be extracted from the image data.

The image/acquisition device 401 may additionally include or be associated with one or more scanners, readers, interrogators, and similar words used herein interchangeably configured for capturing parcel/item/shipment indicia for each parcel/item/shipment (e.g., including parcel/item/shipment identifiers). For example, the scanners may include a barcode scanner, an RFID reader, and/or the like configured to recognize and identify parcel/item/shipment identifiers associated with each parcel/item/shipment. In one embodiment, the image/acquisition device 401 may be capable of receiving visible light, infrared light, radio transmissions, and other transmissions capable of transmitting information to the image/acquisition device 401. Similarly, the image/acquisition device 401 may include or be used in association with various lighting, such as light emitting diodes (LEDs), Infrared lights, array lights, strobe lights, and/or other lighting mechanisms to sufficiently illuminate the zones of interest to capture image data for analysis.

Similar to mobile computing entities 110 described above, in one embodiment, the conveying mechanism 115, multi-view image capture system 400, and/or image/acquisition devices 401 may also include one or more communications interfaces for communicating with various computing entities, such as by communicating information/data, content, information/data, and/or similar terms used herein interchangeably that can be transmitted, received, operated on, processed, displayed, stored, and/or the like. Such communication may be executed using a wired data transmission protocol, such as FDDI, DSL, Ethernet, ATM, frame relay, DOCSIS, or any other wired transmission protocol. Similarly, the conveying mechanism 115 may be configured to communicate via wireless external communication networks using any of a variety of protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, NFC protocols, Bluetooth™ protocols, wireless USB protocols, long range low power (LoRa), LTE Cat M1, NarrowBand IoT (NB IoT), and/or any other wireless protocol.

As will be understood by those skilled in the art, the multi-view image capture system 400 may include more than one image/acquisition device 401 (see FIG. 6B). In various embodiments, one or more additional image/acquisition devices may be used to capture additional image data at one or more additional locations along the conveying mechanism 115 or an additional conveying mechanism. Such additional image/acquisition devices 401 may be located, for example, after the flow of items along the conveying mechanism 115 is disturbed (e.g., the flow of shipments/items is culled, merged with an additional flow of shipments/items, or diverted to an additional conveying mechanism). Alternatively, one or more additional image/acquisition devices may be located along the conveying mechanism 115, such that the one or more additional image/acquisition devices may capture updated image data after one or more of the shipments/items may have been removed from the conveying mechanism 115. In various embodiments, the one or more additional image/acquisition devices may include components substantially similar to the image/acquisition device 401. For example, the one or more additional image/acquisition devices may include or be associated with one or more imaging devices and one or more scanners, readers, interrogators, and similar words used herein interchangeably, as described above in regards to the image/acquisition device 401. However, the one or more additional image/acquisition devices may include fewer components than image/acquisition device 401. For example, the one or more additional image/acquisition devices may not include a scanner, reader, interrogator, or similar words used herein, and may be configured to receive parcel/item/shipment identifiers from the image/acquisition device 401.

IV. Exemplary System Operation

Parcels within a transportation and logistics network traverse multiple locations at which dimensions of the parcel must be obtained and/or confirmed. Manually measuring dimensions of a parcel, or otherwise clumsy mathematical acquisition of the dimensions of a parcel can cause delays in shipping as well as loss of information about parcels. Further, a shipper of a parcel may not be adept at measuring or confirming parcel dimensions, let alone at accurately inputting the dimensions into a mobile device logistics application. At any location within the carrier's logistics network, or between points for that matter, damage of any type may be caused to a parcel. Damage to parcels can be costly and difficult to pin point, mitigate, and prevent through the use of tedious and clumsy human/visual estimation. Resources dedicated to such obtaining and confirmation of parcel dimensions, as well as assessment and mitigation of parcel damage are easily exhausted due to the unpredictable complexity of a route traversed by a parcel through a carrier's logistic network and the risk of errors introduced by reliance upon human input. Further, time to mitigate is inexcusably compromised due to human error. As such, the ability to capture a single digital image representing a parcel throughout a carrier's logistic network and programmatically determine and confirm dimensions of the parcel dramatically increases the efficient use of computing resources.

The present invention simplifies and automates parts of the shipping process for senders/shippers via a mobile device logistics/shipping application, which results in higher customer satisfaction. The present invention also enables savings from reduced billing adjustments as a result of having more accurate dimensional data at the time of shipment. The present invention also enables pin-pointing where in the transit or shipping network the damage is occurring. This results in higher customer satisfaction, the ability to identify areas within a center or a hub where parcels get damaged most frequently, immediate responses to damaged parcels, improvement in the handling of packages due to constant monitoring and feedback, and savings due to reduced damage claims.

Inconsistencies between determined dimensions and known dimensions (retrieved using the identifying information), as calculated by the present invention, can trigger notifications to personnel and can trigger a predictive parcel damage mitigation system to determine damage severity, characterization, and mitigation. An exemplary predictive parcel damage mitigation system is disclosed in U.S. Provisional Application Ser. No. 62/565,404, titled "SYSTEMS AND METHODS FOR PREDICTIVE PARCEL DAMAGE IDENTIFICATION, ANALYSIS, AND MITIGATION," filed Sep. 29, 2017, the contents of which are incorporated herein by reference in their entirety.

FIG. 7 illustrates an exemplary parcel transit route 700 for use with embodiments of the present disclosure. In various embodiments, a parcel transit route 700 may comprise a plurality of parcel interaction points 701-707 through which a parcel 710 traverses from origin 701 to destination 707. In the example illustrated in FIG. 7, an origin interaction point 701 may be a residence from where the parcel 710 is originally retrieved by a parcel transit service.

The parcel 710 may interact with a second parcel interaction point 702, which may be a manual delivery vehicle 100 as defined above. The parcel 710 may continue through the parcel carrier's logistic network to a next parcel interaction point 703, which may be a hand truck or forklift type assistance device for moving the parcel from the manual delivery vehicle 100 to or within a package center or hub or other parcel storage facility. The vehicle 703, in some embodiments, may be a conveying mechanism 115 as defined herein.

The parcel 710 may interact with a next parcel interaction point 704, which in some embodiments may be a package center or hub or other parcel storage facility. Next, the parcel 710 may interact with a next parcel interaction point 705, which may be a hand truck or forklift type assistance device for moving the parcel from the package center or hub to a manual delivery vehicle 100 and/or within a package center or hub and/or to a conveying mechanism 115 as defined herein.

Next, the parcel 710 may interact with an autonomous vehicle 140 or manual delivery vehicle 100 at a next parcel interaction point 706. Finally, in this embodiment, the parcel 710 interacts with a destination interaction point 707, which may be a residence or point of business.

It will be appreciated that, throughout the parcel carrier's logistic network 700 that is traversed by a parcel 710, each parcel interaction point 701-707 is equipped according to the present disclosure with one or more digital image capture mechanisms/systems and/or other identification capturing mechanism (or image/acquisition device 401 as defined herein). As parcel 710 traverses through parcel transit route 700, each of the interaction points may capture one or more digital images representing one or more fields of view of the parcel 710.

It will be appreciated that, throughout the parcel carrier's logistic network 700 that is traversed by a parcel 710, each interaction point 701-707 may be any one of the types of parcel interaction points as defined herein. For example, instead of origin interaction point 701 being a residence, it may be a place of business. In another example, instead of destination interaction point 707 being a residence, it may be a place of business. As such, it will be appreciated that multiple intervening parcel interaction points can be present and traversed by parcel 710 within the parcel carrier's logistics network 700. It will also be appreciated that a parcel carrier's logistics network may have fewer or more interaction points than are depicted in the example in FIG. 7.

FIG. 6B illustrates an exemplary multi-view image capture system 400 for use with embodiments of the present disclosure. As will be recognized, and as described above, various types of imaging devices and systems 401 can be used to capture digital images and other information/data about a parcel 710—including imaging devices and systems associated with manual delivery vehicles 100, analysis computing entities 105, mobile computing entities 110, one or more autonomous vehicles 140, and/or the like (at various points in the transportation and logistics network). The digital images may comprise timestamps indicative of the time they were captured, location information/data indicative of the location they were captured, device/entity information/data indicative of the device/entity that captured the digital images, and/or the like. In embodiments, parcel interaction points along a carrier's logistics network are equipped with data or digital image capturing mechanisms/devices 401A-401N through which one or more of a plurality of fields of view of a parcel 710 can be captured and transmitted from the parcel interaction point to an analysis computing entity 105 via one or more networks 135.

In embodiments, a parcel 710 may be surrounded by a plurality of acquisition devices 401A-401N. Each image/acquisition device 401A-401N has associated therewith a field of view or pose view 403A-403N representing various views of the parcel 710. Digital files representing identifying information/data, including digital images or otherwise (e.g., including parcel identification information as described herein), are transmitted from devices/mechanisms 401A-401N to analysis computing entity 105 via one or more networks 135.

In embodiments, a parcel 710 may be associated with a rotation mechanism such that a single image/acquisition device 401 (and/or other appropriate computing entity) may capture multiple digital images representing different fields of view of the parcel 710 (i.e., without the need for multiple acquisition or collection devices). In such embodiments, a single acquisition device 401 (and/or other appropriate computing entity) may locally store all acquired/collected images and/or data to be transmitted in a single transmission to an analysis computing entity 105 via one or more networks 135. And as will be recognized, various other entities (such as those described above) can be used to capture one or more images of parcel 710. It will be appreciated that, for the purposes of the present disclosure, only a single digital image of the parcel need be captured and transmitted for processing.

FIG. 8A illustrates an exemplary parcel 710 for use with embodiments of the present disclosure. In embodiments, a parcel 710 is comprised of a plurality of edges, including a lower front edge 807 positioned between a first lower front corner 801 and a second lower front corner 802. The lower front edge 807 has a length H2.

The parcel 710 further comprises a first front side edge 811 positioned between the first front lower corner 801 and a first front upper corner 803. The first front side edge 811 has a length DL. The parcel 710 also comprises a first lower side edge 815 (shown in phantom dotted line) positioned between a first lower front corner 801 and a first lower rear corner (not shown). Additionally, the parcel 710 further comprises a lower rear edge 809 positioned between the first lower rear corner (not shown) and a second lower rear corner 806. As shown, the parcel 710 further comprises a second side lower edge 817 positioned between the second lower rear corner 806 and the second lower front corner 802. The second lower side edge 817 has a length DR. The parcel 710 further comprises a second front side edge 813 positioned between the second lower front corner 802 and a second upper front corner (not labeled).

The parcel 710 further comprises an upper front edge 808 positioned between the second upper front corner (not labeled) and the first upper front corner 803. The parcel 710 also comprises a first upper side edge 816 positioned between the first upper front corner 803 and a first upper rear corner 804. The first upper side edge 816 has a length UL. The parcel 710 further comprises an upper rear edge 810 positioned between the first upper rear corner 804 and a second upper rear corner 805. The upper rear edge 810 has a length H1. Opposite the first upper side edge 816, the parcel 710 further comprises a second upper side edge 818 positioned between the second upper front corner (not labeled) and the second upper rear corner 805.

The parcel 710 further comprises a first rear side edge 812 positioned between the first lower rear corner (not shown) and the first upper rear corner 804. Additionally, the parcel 710 comprises a second rear side edge 814 positioned between the second lower rear corner 806 and the second upper rear corner 805. The second rear side edge 814 has a length UR. It will be appreciated that H1≈H2, DR≈UL, and UR≈DL.

The parcel 710 has affixed thereto a reference 819, such as a label, having known side lengths of R1 and R2. In some embodiments, R1 and R2 are determined using machine learning. In some embodiments, reference 819 includes digital representation of information related to the parcel 710 such that the digital representation may be scanned or otherwise read and information can be retrieved pertaining to the parcel.

Next, FIG. 8B illustrates an exemplary parcel digital image 800 for use with embodiments of the present disclosure. Parcel digital image 800 includes a plurality of pixels representing parcel 710 (with features as depicted in FIG. 8A). A horizontal axis (e.g., an X axis) and a vertical axis (e.g., a Y axis) are positioned with an origin at the bottom leftmost corner or point of parcel digital image 800 for processing of the image and detection and calculation of dimensions of the parcel.

FIG. 8C illustrates an exemplary process 850 for use with embodiments of the present disclosure. In embodiments, a single view of a parcel is digitally captured and transmitted by an image/acquisition device (e.g., 401A-401N) to an analysis computing entity (e.g., 105) via one or more networks (e.g., 135) for processing. The analysis computing entity receives a first parcel digital image (Operation/Step 851). The first parcel digital image is prepared for processing by superimposing a horizontal and vertical axis to the parcel digital image with an origin (e.g., 0, 0) at the bottom leftmost point of the parcel digital image.

In embodiments, the first parcel digital image is processed such that pixels are extracted to identify, using digital detection, a first group of pixels in the first parcel digital image corresponding to a first upper rear corner of the parcel and a second group of pixels in the first parcel digital image corresponding to a second upper rear corner of the parcel (Operation/Step 852). In embodiments, the first upper rear corner and the second upper rear corner are separated by an upper rear edge of the parcel. In embodiments, the upper rear edge of the parcel has a length H1.

In embodiments, the first parcel digital image is processed such that pixels are extracted to identify, using digital detection, a third group of pixels in the first parcel digital image corresponding to a first upper front corner and a fourth group of pixels in the first parcel digital image corresponding to a first lower front corner of the parcel in the first parcel digital image (Operation/Step 853). In embodiments, the first upper front corner and the first lower front corner are separated by a first front side edge of the parcel. In embodiments, the first front side edge of the parcel has a length DL. In embodiments, the first upper front corner and the first upper rear corner are separated by a first upper side edge of the parcel, and the first upper side edge of the parcel has a length UL.

In embodiments, the first parcel digital image is processed such that pixels are extracted to identify, using digital detection, a fifth group of pixels in the first parcel digital image corresponding to a second lower front corner and a sixth group of pixels in the first parcel digital image corresponding to a second lower rear corner of the parcel in the first parcel digital image (Operation/Step 854). In embodiments, the second lower front corner and the second lower rear corner are separated by a second lower side edge of the parcel and the second lower side edge of the parcel has a length DR. In embodiments, the second lower front corner and the first lower front corner are separated by a lower front edge of the parcel, and the lower front edge of the parcel has a length H2. In embodiments, the second upper rear corner and the second lower rear corner are separated by a second rear side edge of the parcel, and the second rear side edge of the parcel has a length UR.

In embodiments, the first parcel digital image is processed such that pixels are extracted to identify, using digital detection, a seventh group of pixels in the first parcel digital image corresponding to a reference label affixed to the parcel, and the reference label has a known first edge length R1 and a known second edge length R2 (operation/Step 855).

In embodiments, using the identified groups of pixels, each of lengths H1, UL, DL, DR, H2, and U2, is programmatically calculated as well as an associated angle for each length relative the horizontal axis of the first parcel digital image (Operation/Step 856).

In embodiments, correction factors are programmatically determined to apply to each of lengths H1, UL, DL, DR, H2, and U2 based upon a scale programmatically calculated based upon R1 and R2 (Operation/Step 857)

In embodiments, the correction factors are applied to each of lengths H1, UL, DL, DR, H2, and U2 and the lengths are confirmed to have the following relationships: length H1≈length H2, length DR≈length UL, and length UR≈length DL (Operation/Step 858). For example, a busy background will require more tolerance than a nice, clean, single color background. In some embodiments, "≈" represents an 80%-90% match.

In embodiments, upon confirming that length H1≈length H2, length DR≈length UL, and length UR≈length DL, the corrected lengths are scaled to inches and output the scaled corrected lengths as calculated dimensions of the parcel (Operation/Step 859).

The methods, apparatus, and computer program products described herein are operable to programmatically determine the correction factors and the scale by programmatically determining an angular skew between a first relative angle between lengths R1 and H1 and a second relative angle between lengths R1 and H2, upon determining that the angular skew is below an angular skew threshold, programmatically calculating a vertical angle of the parcel in the first parcel digital image according to the equation $$\sin^{-1}\left(\frac{R1}{R2}\right),$$

programmatically calculating a front side angle of the parcel in the first parcel digital image according to the equation $$90° - \sin^{-1}\left(\frac{R1}{R2}\right),$$

and, using the vertical angle of the parcel and the front side angle of the parcel, calculating correction factors facilitating generation, from lengths R1 and R2, of scales for each of the upper rear edge, first upper side edge, first front side edge, lower front edge, second lower side edge, and second rear side edge of the parcel.

It will be appreciated that the process 850 depicted in FIG. 8C provides for finding intersections between edges which can be used to select specific pixel coordinates (x, y) that represent corners. The corners can be used, along with an assumption of perfect lines between them, to determine the distance between the lines.

FIG. 8D illustrates an exemplary process 865 for use with embodiments of the present disclosure. In embodiments, the calculated dimensions of the parcel are compared to the known dimension information (Operation/Step 866). Upon determining that a difference between the calculated dimensions and the known dimension information exceeds a threshold (Operation/Step 867), a dimension anomaly signal is transmitted to a predictive parcel damage mitigation system (Operation/Step 869).

In embodiments, upon determining that a difference between the calculated dimensions and the known dimension information does not meet a threshold (Operation/Step 867), a dimension acceptance signal is transmitted to the mobile computing device (Operation/Step 868).

For example, the threshold is based on what is outside the realm of normal variance between digital images. Generally, if the difference is more than 30%, it may just mean that the parcel is too far away and the pixel density for desired accuracy is not available. However, if two edges are within +/−10% and another is ⅓ the expected size, an alarm is raised. There may be sufficient image recognition but one or maybe two side lengths are out of spec.

In embodiments, the correction factors and the scale are determined by programmatically determining an angular skew between a first relative angle between R1 and H1 and a second relative angle between R1 and H2. For example, if $\theta_{SR} \approx \theta_{SL}$, no correction factors are required.

Upon determining the angular skew is below an angular skew threshold, a vertical angle of the parcel in the first parcel digital image is calculated according to the equation $$\sin^{-1}\left(\frac{R1}{R2}\right).$$

A front side angle of the parcel in the first parcel digital image is calculated according to the equation $$90° - \sin^{-1}\left(\frac{R1}{R2}\right).$$

Using the vertical angle of the parcel and the front side angle of the parcel, correction factors are calculated such that known R1 and R2 can be extrapolated to generate a scale for each of the upper rear edge, first front side edge, first upper side edge, second lower side edge, lower front edge, second rear side edge of the parcel.

In embodiments, known dimension information about the parcel can be retrieved according to parcel information obtained from the reference label. In other embodiments, R1 and R2 are determined using machine learning.

In embodiments, upon determining that the angular skew exceeds the angular skew threshold, corrective trigonometric calculations are applied before calculating the vertical angle of the parcel. For example, if the angular skew exceeds the angular skew threshold (e.g., 90%), the angle between the parcel and the reference object is greater than 18 degrees. In such a case, the side length must be compressed down to the component of the parcel that is parallel with the side length.

In embodiments, applying the corrective trigonometric calculations comprises calculating an orientation of the parcel relative to the observer (camera) using the reference object. From there, trigonometric projections are applied based on the calculated angles of rotation and tilt to calculate how much "compression" should be expected for a side of a parcel. For example, if the parcel is only rotated 10 degrees, the side that is mostly facing the observer (camera) will require very little correction. However, the side that is barely observable is referred to as compressed in the image because if its length were to be calculated by counting pixels without first trying to correct for skew, a much smaller side length than actual would result. Correction factors represent the amount of compression in that axis is expected based on the angles the parcel is presenting to the observer (camera).

For example, consider a reference object that is 1 inch×w inch, but it is skewed at an angle of 30 degrees relative to the parcel side length (ref1 to h1). A right triangle with ref1 as the hypotenuse and another side parallel to h1 can be created, and the parallel side would then measure 0.866 inches 1*SIN(60). This compression of the side is used because of the skew to offset the known length which is used to compare all of the sides to and base the dimensions off of.

In embodiments, the correction factors comprise three separate scaling factors between 0 and 1 which denote how much a specific axis is compressed in computer vision. Dividing the observed length directly from the digital image by the correction factor yields the actual length of the specific axis.

In embodiments of the present disclosure, the analysis computing entity 105 receives identifying information associated with a parcel in addition to digital images representing the parcel. In embodiments, other information associated with an interaction point may be received or determined by the analysis computing entity 105. Such information may include temperature, time of day, typical ambient conditions, historical damage risk, and the like.

In embodiments of the present disclosure, all information related to damage analyses and condition confirmations is logged by the analysis computing entity 105 and stored in one or more associated non-volatile storage devices 210 (e.g., databases or data stores as described herein).

In embodiments of the present disclosure, notifications may be provided based upon any determination or status to a shipper, a receiver, and/or internally to a parcel transit provider.

V. Conclusion

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for programmatic parcel dimension determination in a parcel transit network, the parcel transit network comprising an origin interaction point, a plurality of parcel interaction points, and a destination interaction point, the apparatus comprising at least one processor and at least one memory including computer program code, the at least one memory and the computer program code configured to, with the at least one processor, cause the apparatus to:
receive a first parcel digital image from a mobile computing device at the origin interaction point, the first parcel digital image associated with and representative of a parcel being transported from the origin interaction point to the destination interaction point via the plurality of parcel interaction points;
identify, using digital detection, a first group of pixels in the first parcel digital image corresponding to a first upper rear corner of the parcel, and a second group of pixels in the first parcel digital image corresponding to a second upper rear corner of the parcel,
wherein the first upper rear corner and the second upper rear corner are separated by an upper rear edge of the parcel, the upper rear edge of the parcel having a length H1;
identify, using digital detection, a third group of pixels in the first parcel digital image corresponding to a first upper front corner, and a fourth group of pixels in the first parcel digital image corresponding to a first lower front corner of the parcel in the first parcel digital image,
wherein the first upper front corner and the first lower front corner are separated by a first front side edge of the parcel, the first front side edge of the parcel having a length DL, and
wherein the first upper front corner and the first upper rear corner are separated by a first upper side edge of the parcel, the first upper side edge of the parcel having a length UL;
identify, using digital detection, a fifth group of pixels in the first parcel digital image corresponding to a second lower front corner and a sixth group of pixels in the first parcel digital image corresponding to a second lower rear corner of the parcel in the first parcel digital image,
wherein the second lower front corner and the second lower rear corner are separated by a second lower side edge of the parcel, the second lower side edge of the parcel having a length DR,
wherein the second lower front corner and the first lower front corner are separated by a lower front edge of the parcel, the lower front edge of the parcel having a length H2, and
wherein the second upper rear corner and the second lower rear corner are separated by a second rear side edge of the parcel, the second rear side edge of the parcel having a length UR;
identify, using digital detection, a seventh group of pixels in the first parcel digital image corresponding to a reference label affixed to the parcel, the reference label having a known first edge length R1 and a known second edge length R2;
programmatically calculate, using the identified groups of pixels, each of lengths H1, UL, DL, DR, H2, and U2, as well as an associated angle for each length relative a the horizontal axis of the first parcel digital image;
programmatically determine correction factors to apply to each of lengths H1, UL, DL, DR, H2, and U2 based upon a scale programmatically calculated based upon R1 and R2;
apply the correction factors to each of lengths H1, UL, DL, DR, H2, and U2;
confirm that length H1 length H2, length DR length UL, and length UR length DL; and upon confirming that length H1 length H2, length DR length UL, and length UR length DL, scale the corrected lengths to inches and output the scaled corrected lengths as calculated dimensions of the parcel.

2. The apparatus of claim 1, wherein the at least one memory and the computer program code are configured to, with the at least one processor, cause the apparatus to programmatically determine the correction factors and the scale by:

programmatically determining an angular skew between a first relative angle between lengths R1 and H1 and a second relative angle between lengths R1 and H2;

upon determining that the angular skew is below an angular skew threshold, programmatically calculating a vertical angle of the parcel in the first parcel digital image according to the equation $$\sin^{-1}\left(\frac{R1}{R2}\right);$$

programmatically calculating a front side angle of the parcel in the first parcel digital image according to the equation and $$90° - \sin^{-1}\left(\frac{R1}{R2}\right);$$

using the vertical angle of the parcel and the front side angle of the parcel, calculating correction factors facilitating generation, from lengths R1 and R2, of scales for each of the upper rear edge, first upper side edge, first front side edge, lower front edge, second lower side edge, and second rear side edge of the parcel.

3. The apparatus of claim 2, wherein, upon determining that the angular skew exceeds the angular skew threshold, apply corrective trigonometric calculations before calculating the vertical angle of the parcel.

4. The apparatus of claim 3, wherein applying the corrective trigonometric calculations comprises adjusting a length of an axis based on the angular skew.

5. The apparatus of claim 1, wherein the at least one memory and the computer program code are configured to, with the at least one processor, cause the apparatus to:

compare the calculated dimensions of the parcel to known dimension information about the parcel retrieved based upon parcel information obtained from the reference label; and upon determining that a difference between the calculated dimensions and the known dimension information exceeds a threshold, transmit a dimension anomaly signal to a predictive parcel damage mitigation system.

6. The apparatus of claim 1, wherein the at least one memory and the computer program code are configured to, with the at least one processor, cause the apparatus to:

compare the calculated dimensions of the parcel to known dimension information about the parcel retrieved based upon parcel information obtained from the reference label; and upon determining that a difference between the calculated dimensions and the known dimension information does not exceed a threshold, transmit a dimension acceptance signal to the mobile computing device.

7. The apparatus of claim 1, wherein lengths R1 and R2 are determined using machine learning.

8. The apparatus of claim 1, wherein the correction factors comprise one of three scaling factors, each between 0 and 1.

9. The apparatus of claim 1, wherein "≈" represents an 80%-90% match.

10. A system for programmatic parcel dimension determination in a parcel transit network, the parcel transit network comprising an origin interaction point, a plurality of parcel interaction points, and a destination interaction point, the system comprising at least one server and at least one repository, the at least one server including computer program code, at least one memory and the computer program code configured to, with at least one processor, cause the system to:

receive a first parcel digital image from a mobile computing device at the origin interaction point, the first parcel digital image associated with and representative of a parcel being transported from the origin interaction point to the destination interaction point via the plurality of parcel interaction points;

identify, using digital detection, a first group of pixels in the first parcel digital image corresponding to a first upper rear corner of the parcel, and a second group of pixels in the first parcel digital image corresponding to a second upper rear corner of the parcel, wherein the first upper rear corner and the second upper rear corner are separated by an upper rear edge of the parcel, the upper rear edge of the parcel having a length H1;

identify, using digital detection, a third group of pixels in the first parcel digital image corresponding to a first upper front corner, and a fourth group of pixels in the first parcel digital image corresponding to a first lower front corner of the parcel in the first parcel digital image, wherein the first upper front corner and the first lower front corner are separated by a first front side edge of the parcel, the first front side edge of the parcel having a length DL, and wherein the first upper front corner and the first upper rear corner are separated by a first upper side edge of the parcel, the first upper side edge of the parcel having a length UL;

identify, using digital detection, a fifth group of pixels in the first parcel digital image corresponding to a second lower front corner and a sixth group of pixels in the first parcel digital image corresponding to a second lower rear corner of the parcel in the first parcel digital image, wherein the second lower front corner and the second lower rear corner are separated by a second lower side edge of the parcel, the second lower side edge of the parcel having a length DR, wherein the second lower front corner and the first lower front corner are separated by a lower front edge of the parcel, the lower front edge of the parcel having a length H2, and wherein the second upper rear corner and the second lower rear corner are separated by a second rear side edge of the parcel, the second rear side edge of the parcel having a length UR;

identify, using digital detection, a seventh group of pixels in the first parcel digital image corresponding to a reference label affixed to the parcel, the reference label having a known first edge length R1 and a known second edge length R2;

programmatically calculate, using the identified groups of pixels, each of lengths H1, UL, DL, DR, H2, and U2, as well as an associated angle for each length relative a the horizontal axis of the first parcel digital image;

programmatically determine correction factors to apply to each of lengths H1, UL, DL, DR, H2, and U2 based upon a scale programmatically calculated based upon R1 and R2;

apply the correction factors to each of lengths H1, UL, DL, DR, H2, and U2;

confirm that length H1≈length H2, length DR≈length UL, and length UR≈length DL; and upon confirming that length H1≈length H2, length DR≈length UL, and length UR≈length DL, scale the corrected lengths to inches and output the scaled corrected lengths as calculated dimensions of the parcel.

11. The system of claim 10, wherein the at least one memory and the computer program code are configured to, with the at least one processor, cause the system to programmatically determine the correction factors and the scale by:

programmatically determining an angular skew between a first relative angle between lengths R1 and H1 and a second relative angle between lengths R1 and H2;

upon determining that the angular skew is below an angular skew threshold, programmatically calculating a vertical angle of the parcel in the first parcel digital image according to the equation $$\sin^{-1}\left(\frac{R1}{R2}\right);$$

programmatically calculating a front side angle of the parcel in the first parcel digital image according to the equation and $$90° - \sin^{-1}\left(\frac{R1}{R2}\right);$$

using the vertical angle of the parcel and the front side angle of the parcel, calculating correction factors facilitating generation, from lengths R1 and R2, of scales for each of the upper rear edge, first upper side edge, first front side edge, lower front edge, second lower side edge, and second rear side edge of the parcel.

12. The system of claim 11, wherein, upon determining that the angular skew exceeds the angular skew threshold, apply corrective trigonometric calculations before calculating the vertical angle of the parcel.

13. The system of claim 12, wherein applying the corrective trigonometric calculations comprises adjusting a length of an axis based on the angular skew.

14. The system of claim 10, wherein the at least one memory and the computer program code are configured to, with the at least one processor, cause the system to:

compare the calculated dimensions of the parcel to known dimension information about the parcel retrieved based upon parcel information obtained from the reference label; and upon determining that a difference between the calculated dimensions and the known dimension information exceeds a threshold, transmit a dimension anomaly signal to a predictive parcel damage mitigation system.

15. The system of claim 10, wherein the at least one memory and the computer program code are configured to, with the at least one processor, cause the system to:

compare the calculated dimensions of the parcel to known dimension information about the parcel retrieved based upon parcel information obtained from the reference label; and upon determining that a difference between the calculated dimensions and the known dimension information does not exceed a threshold, transmit a dimension acceptance signal to the mobile computing device.

16. The system of claim 10, wherein lengths R1 and R2 are determined using machine learning.

17. The system of claim 10, wherein the correction factors comprise one of three scaling factors, each between 0 and 1.

18. The system of claim 10, wherein "≈" represents an 80%-90% match.

* * * * *

UNITED STATES PATENT AND TRADEMARK OFFICE
CERTIFICATE OF CORRECTION

PATENT NO. : 10,885,653 B2
APPLICATION NO. : 16/245916
DATED : January 5, 2021
INVENTOR(S) : Asheesh Goja et al.

It is certified that error appears in the above-identified patent and that said Letters Patent is hereby corrected as shown below:

In the Claims

Column 32, Line 59, Claim 1, delete "a" and insert -- to --, therefor.

Column 32, Lines 66-67, Claim 1, delete "H1 length H2, length DR length UL, and length UR length" and insert -- H1≈length H2, length DR≈length UL, and length UR≈length --, therefor.

Column 33, Lines 1-2, Claim 1, delete "H1 length H2, length DR length UL, and length UR length" and insert -- H1≈length H2, length DR≈length UL, and length UR≈length --, therefor.

Column 33, Line 25, Claim 2, after "equation" delete "and".

Column 35, Line 4, Claim 10, delete "a" and insert -- to --, therefor.

Column 35, Line 35, Claim 11, after "equation" delete "and".

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*